(12) United States Patent
Dempsey et al.

(10) Patent No.: US 12,529,057 B2
(45) Date of Patent: Jan. 20, 2026

(54) THERAPEUTICS FOR SYNGAP HAPLOINSUFFICIENCY

(71) Applicant: QUIVER HOLDINGS INC., Cambridge, MA (US)

(72) Inventors: Graham T. Dempsey, Sudbury, MA (US); Caitlin Lewarch, Cambridge, MA (US); Matt Mccabe, Cambridge, MA (US); James Fink, Cambridge, MA (US); David Gerber, Cambridge, MA (US); Luis Williams, Cambridge, MA (US)

(73) Assignee: QUIVER HOLDINGS INC., Cambridge, MA (US)

( * ) Notice: Subject to any disclaimer, the term of this patent is extended or adjusted under 35 U.S.C. 154(b) by 1 day.

(21) Appl. No.: 17/934,411

(22) Filed: Sep. 22, 2022

(65) Prior Publication Data

US 2023/0265436 A1   Aug. 24, 2023

Related U.S. Application Data

(60) Provisional application No. 63/313,702, filed on Feb. 24, 2022.

(51) Int. Cl.
  *C12N 15/113*   (2010.01)
  *A61K 31/7125*  (2006.01)

(52) U.S. Cl.
  CPC ...... *C12N 15/1137* (2013.01); *A61K 31/7125* (2013.01); *C12N 2310/11* (2013.01); *C12N 2310/315* (2013.01); *C12N 2310/3231* (2013.01); *C12N 2310/3341* (2013.01); *C12N 2310/341* (2013.01); *C12N 2310/346* (2013.01)

(58) Field of Classification Search
  CPC ............. C12N 15/113; C12N 15/1137; C12N 2310/11; C12N 2310/16; C12N 2310/315; C12N 2310/3231; C12N 2310/3341; C12N 2310/341; C12N 2310/346; C12N 2310/321; A61K 31/7125
  See application file for complete search history.

(56) References Cited

U.S. PATENT DOCUMENTS

| | | | | |
|---|---|---|---|---|
| 6,582,908 B2 * | 6/2003 | Fodor | .................... | C07H 21/00 506/30 |
| 11,083,745 B2 * | 8/2021 | Aznarez | ................ | C12Q 1/6883 |
| 11,618,900 B2 * | 4/2023 | Huganir | ................ | C12Q 1/6883 514/44 A |
| 2013/0267429 A1 * | 10/2013 | Gardner | ................ | C12Q 1/6876 506/8 |
| 2017/0369945 A1 | 12/2017 | Li et al. | | |
| 2018/0369275 A1 | 12/2018 | Arnarez et al. | | |
| 2021/0077421 A1 | 3/2021 | Sebree et al. | | |
| 2021/0268667 A1 | 9/2021 | Aznarez et al. | | |
| 2022/0290142 A1 | 9/2022 | Aznarez et al. | | |

FOREIGN PATENT DOCUMENTS

| WO | WO-2006034348 A2 * | 3/2006 | ............... A61P 1/16 |
|---|---|---|---|
| WO | WO-2021226663 A1 * | 11/2021 | ......... C07K 14/4706 |
| WO | WO-2022266351 A2 * | 12/2022 | .............. A61P 25/00 |

OTHER PUBLICATIONS

Cao, Y et al. MiR-29c-3p May Promote the Progression of Alzheimer's Disease through BACE1. Journal of Healthcare Engineering, Dec. 15, 2021, [online], [retrieved on Jul. 27, 2023]. <DOI: 10.1155/2021/2031407> (Year: 2021).*
Reimegård, Johan et al. "A combined approach for single-cell mRNA and intracellular protein expression analysis." Communications biology vol. 4,1 624. May 25, 2021, doi:10.1038/s42003-021-02142-w (Year: 2021).*
Kendrick, Nancy. "A gene's mRNA level does not usually predict its protein level." Kendrick Labs. Sep. 25, 2014. (Year: 2014).*
Friedman , "Most mammalian mRNAs are conserved targets of MicroRNAs", Genome Res 19:92-105 (2009).
Lewis , "Conserved seed pairing, Often Flanked by Adenosines, Indicates that Thousands of Human Genes are MicroRNA Targets", Cell 120:15-20 (2005).
Mccall , "Toward the human cellular microRNAome", Genome Res 27(10):1769-1781 (2017).
Shin , "Expanding the microRNA targeting code: functional sites with centered pairing", Mol Cell 38(6):789-802 (2010).
Thomson , "Experimental strategies for microRNA target identification", Nucleic Acid Res 39(16):6845-53 (2011).

* cited by examiner

*Primary Examiner* — Jennifer Dunston
*Assistant Examiner* — Christina Tran
(74) *Attorney, Agent, or Firm* — Thomas C. Meyers; Sullivan & Worcester LLP

(57) ABSTRACT

The invention relates to therapeutic compositions for disorders associated with haploinsufficiency. The invention provides antisense oligonucleotides useful for treating neurodevelopmental disorders associated with mutations in the SYNGAP gene. The invention provides compositions that include synthetic antisense oligonucleotides (ASOs) that promote expression of the SynGAP protein by one or any combination of (i) preventing one or more miRNAs from interfering with production of the SynGAP protein; (ii) binding to 5'-UTR of the SYNGAP1 transcript and augmenting translation of the Syngap protein; and (iii) promoting RNAseH cleavage of antisense long non-coding RNAs that are anticorrelated with SYNGAP expression. When the composition is delivered to a patient with SYNGAP haploinsufficiency, the ASOs promote expression of the SynGAP protein.

8 Claims, 11 Drawing Sheets
Specification includes a Sequence Listing.

SEQUENCE LISTING

```
Sequence total quantity: 29
SEQ ID NO: 1               moltype = DNA   length = 17
FEATURE                    Location/Qualifiers
source                     1..17
                           mol_type = other DNA
                           organism = synthetic construct
SEQUENCE: 1
ccaacggcag cagcggc                                                              17

SEQ ID NO: 2               moltype = DNA   length = 17
FEATURE                    Location/Qualifiers
source                     1..17
                           mol_type = other DNA
                           organism = synthetic construct
SEQUENCE: 2
aggagaataa gagccaa                                                              17

SEQ ID NO: 3               moltype = DNA   length = 19
FEATURE                    Location/Qualifiers
source                     1..19
                           mol_type = other DNA
                           organism = synthetic construct
SEQUENCE: 3
gagaggagca gagagaagc                                                            19

SEQ ID NO: 4               moltype = DNA   length = 19
FEATURE                    Location/Qualifiers
source                     1..19
                           mol_type = other DNA
                           organism = synthetic construct
SEQUENCE: 4
gggacggggg agaaagaag                                                            19

SEQ ID NO: 5               moltype = DNA   length = 21
FEATURE                    Location/Qualifiers
source                     1..21
                           mol_type = other DNA
                           organism = synthetic construct
SEQUENCE: 5
ggaggaggag gagaataaga g                                                         21

SEQ ID NO: 6               moltype = DNA   length = 21
FEATURE                    Location/Qualifiers
source                     1..21
                           mol_type = other DNA
                           organism = synthetic construct
SEQUENCE: 6
cagagaggag gagagaggag g                                                         21

SEQ ID NO: 7               moltype = DNA   length = 21
FEATURE                    Location/Qualifiers
source                     1..21
                           mol_type = other DNA
                           organism = synthetic construct
SEQUENCE: 7
agagaggagg agagaggagc a                                                         21

SEQ ID NO: 8               moltype = DNA   length = 21
FEATURE                    Location/Qualifiers
source                     1..21
                           mol_type = other DNA
                           organism = synthetic construct
SEQUENCE: 8
gggagaaaga gggggagaag g                                                         21

SEQ ID NO: 9               moltype = DNA   length = 21
FEATURE                    Location/Qualifiers
source                     1..21
                           mol_type = other DNA
                           organism = synthetic construct
SEQUENCE: 9
agaaagaaga gagaaagagg g                                                         21

SEQ ID NO: 10              moltype = DNA   length = 21
FEATURE                    Location/Qualifiers
source                     1..21
                           mol_type = other DNA
                           organism = synthetic construct
```

| | | |
|---|---|---|
| SEQUENCE: 10 | | |
| ggagaaagaa gagagaaaga g | | 21 |
| SEQ ID NO: 11 | moltype = DNA  length = 16 | |
| FEATURE | Location/Qualifiers | |
| source | 1..16 | |
| | mol_type = other DNA | |
| | organism = synthetic construct | |
| SEQUENCE: 11 | | |
| gatagcaccc cggagt | | 16 |
| SEQ ID NO: 12 | moltype = DNA  length = 17 | |
| FEATURE | Location/Qualifiers | |
| source | 1..17 | |
| | mol_type = other DNA | |
| | organism = synthetic construct | |
| SEQUENCE: 12 | | |
| ggatagcacc ccggagt | | 17 |
| SEQ ID NO: 13 | moltype = DNA  length = 19 | |
| FEATURE | Location/Qualifiers | |
| source | 1..19 | |
| | mol_type = other DNA | |
| | organism = synthetic construct | |
| SEQUENCE: 13 | | |
| gaggatgggg atagcaccc | | 19 |
| SEQ ID NO: 14 | moltype = DNA  length = 20 | |
| FEATURE | Location/Qualifiers | |
| source | 1..20 | |
| | mol_type = other DNA | |
| | organism = synthetic construct | |
| SEQUENCE: 14 | | |
| agaggatggg gatagcaccc | | 20 |
| SEQ ID NO: 15 | moltype = DNA  length = 20 | |
| FEATURE | Location/Qualifiers | |
| source | 1..20 | |
| | mol_type = other DNA | |
| | organism = synthetic construct | |
| SEQUENCE: 15 | | |
| cagaggatgg ggatagcacc | | 20 |
| SEQ ID NO: 16 | moltype = DNA  length = 19 | |
| FEATURE | Location/Qualifiers | |
| source | 1..19 | |
| | mol_type = other DNA | |
| | organism = synthetic construct | |
| SEQUENCE: 16 | | |
| cagaggatgg ggatagcac | | 19 |
| SEQ ID NO: 17 | moltype = DNA  length = 20 | |
| FEATURE | Location/Qualifiers | |
| source | 1..20 | |
| | mol_type = other DNA | |
| | organism = synthetic construct | |
| SEQUENCE: 17 | | |
| tgaggcagag gatggggata | | 20 |
| SEQ ID NO: 18 | moltype = DNA  length = 20 | |
| FEATURE | Location/Qualifiers | |
| source | 1..20 | |
| | mol_type = other DNA | |
| | organism = synthetic construct | |
| SEQUENCE: 18 | | |
| cggagtgaag gggtctgtac | | 20 |
| SEQ ID NO: 19 | moltype = DNA  length = 18 | |
| FEATURE | Location/Qualifiers | |
| source | 1..18 | |
| | mol_type = other DNA | |
| | organism = synthetic construct | |
| SEQUENCE: 19 | | |
| tacggggtag gcggtgtc | | 18 |
| SEQ ID NO: 20 | moltype = DNA  length = 20 | |
| FEATURE | Location/Qualifiers | |
| source | 1..20 | |
| | mol_type = other DNA | |

```
                         organism = synthetic construct
SEQUENCE: 20
ggtgtcctgg ggcaagggtc                                                  20

SEQ ID NO: 21            moltype = DNA   length = 20
FEATURE                  Location/Qualifiers
source                   1..20
                         mol_type = other DNA
                         organism = synthetic construct
SEQUENCE: 21
aggacttcag cagctccccg                                                  20

SEQ ID NO: 22            moltype = DNA   length = 20
FEATURE                  Location/Qualifiers
source                   1..20
                         mol_type = other DNA
                         organism = synthetic construct
SEQUENCE: 22
ccctgcctct cggtcctctg                                                  20

SEQ ID NO: 23            moltype = DNA   length = 20
FEATURE                  Location/Qualifiers
source                   1..20
                         mol_type = other DNA
                         organism = synthetic construct
SEQUENCE: 23
gggtgctaca cttaatcacc                                                  20

SEQ ID NO: 24            moltype = DNA   length = 20
FEATURE                  Location/Qualifiers
source                   1..20
                         mol_type = other DNA
                         organism = synthetic construct
SEQUENCE: 24
gcatcattgg caggtgaggg                                                  20

SEQ ID NO: 25            moltype = DNA   length = 20
FEATURE                  Location/Qualifiers
source                   1..20
                         mol_type = other DNA
                         organism = synthetic construct
SEQUENCE: 25
agcatcattg gcaggtgagg                                                  20

SEQ ID NO: 26            moltype = DNA   length = 20
FEATURE                  Location/Qualifiers
source                   1..20
                         mol_type = other DNA
                         organism = synthetic construct
SEQUENCE: 26
gattcccaga tcaagagcat                                                  20

SEQ ID NO: 27            moltype = DNA   length = 20
FEATURE                  Location/Qualifiers
source                   1..20
                         mol_type = other DNA
                         organism = synthetic construct
SEQUENCE: 27
agcaggcaga gaaggattcc                                                  20

SEQ ID NO: 28            moltype = DNA   length = 20
FEATURE                  Location/Qualifiers
source                   1..20
                         mol_type = other DNA
                         organism = synthetic construct
SEQUENCE: 28
gctgctgtcc caggaagaac                                                  20

SEQ ID NO: 29            moltype = DNA   length = 20
FEATURE                  Location/Qualifiers
source                   1..20
                         mol_type = other DNA
                         organism = synthetic construct
SEQUENCE: 29
gctggcctct tcttagtttg                                                  20
```

THERAPEUTICS FOR SYNGAP HAPLOINSUFFICIENCY

TECHNICAL FIELD

The invention relates to therapeutic compositions for disorders associated with haploinsufficiency.

SEQUENCE LISTING

This application includes and incorporates by reference the electronic sequence listing in ST.26 format, filed herewith. The sequence listing, created on Sep. 22, 2022 is entitled QSTA-045-01US-Sequence-Listing, and is 26 kilobytes in size.

BACKGROUND

Mutations to the SYNGAP1 gene are associated with a severe neurodevelopmental disorder in which 50% of patients present with treatment-refractory seizures and cognitive impairments and 50% also meet the diagnostic criteria for autism spectrum disorder. SYNGAP has also been associated with schizophrenia and intellectual disability. See Gamache, 2020, Twenty years of SynGAP research: from synapses to cognition, J Neurosci 40 (8): 1596-1605 and Jeyabalan, 2016, SYNGAP1: Mind the Gap. Front Cell Neurosci 10: article 32, both incorporated by reference.

In particular, SYNGAP1-related intellectual disability (SYNGAP1-ID) has been characterized in 100% of affected individuals by developmental delay (DD) or intellectual disability (ID), generalized epilepsy (~84% affected individuals), autism spectrum disorder (ASD) and other behavioral abnormalities. This disorder results from an autosomal dominant disease mechanism, typically caused by de novo mutations. Penetrance is 100% and mutations include deletions, nonsense, frameshift and missense. The majority of mutations are nonsense, truncating or frameshift, including several early truncating mutations. This and the presence of deletions has led to the designation of a haploinsufficiency disease mechanism To date more than 50 individuals with SYNGAP1-ID have been reported. In the majority DD/ID was moderate to severe; in some it was mild. The epilepsy is generalized; a subset of individuals with epilepsy have myoclonic astatic epilepsy (Doose syndrome) or epilepsy with myoclonic absences. Behavioral abnormalities can include stereotypic behaviors (e.g., hand flapping, obsessions with certain objects) as well as poor social development. Feeding difficulties can be significant in some. Cardinal features in children are progressive intellectual deterioration, behavioral changes, myoclonus, and epilepsy. 53% of patients are diagnosed by 4 years of age. The occurrence of ASD could be as high as 50%. This includes stereotypic behaviors such as hand flapping, obsessions with certain objects, and poor social development. In addition, inattention, impulsivity, self-directed and other-directed aggressive behavior, elevated pain threshold, hyperacusis, and sleep disorders have been observed.

To date, there have been no disease-specific or disease-moderating treatments for SYNGAP1 neurodevelopmental disorder.

SUMMARY

The invention provides antisense oligonucleotides useful for treating certain neurodevelopmental disorders by promoting expression of the SynGAP protein. Some individuals are born with a heterozygous loss-of-function mutation on the SYNGAP gene (an alias for SYNGAP1) that encodes SynGAP, a condition known as Syngap haploinsufficiency. In Syngap haploinsufficiency, there is only one fully functional copy of the SYNGAP gene. During neurodevelopment, all SynGAP protein must be produced by transcribing that one copy of the gene to pre-mRNA, splicing the pre-mRNA to mRNA, and translating the mRNA to protein. The invention provides compositions and methods that employ various strategies to upregulate expression of the SynGAP protein from the SYNGAP gene. For example, compositions and methods of the invention use the insight that micro-RNAs (miRNAs) may play a role in gene regulation and interfere with the production of SynGAP protein.

Specifically, certain miRNAs may bind to SYNGAP RNA and prevent protein production. Embodiments of the invention provide compositions that include synthetic antisense oligonucleotides (ASOs) that prevent miRNAs from interfering with production of the SynGAP protein.

Secondly, the invention also makes use of an insight that features of the SYNGAP mRNA may impede translational efficiency. Specifically, the 5' untranslated region (5'UTR) of the SYNGAP mRNA may have negative regulatory effects. Some embodiments of the invention provide compositions that include ASOs that mitigated negative regulatory effects associated with the 5' UTR to thereby improve translation of the SynGAP protein.

Thirdly, the invention reflects the insight that long, non-coding RNAs (lncRNAs) antisense to SYNGAP transcripts (e.g., SYNGAP1-AS) may interfere with expression. The invention provides antisense oligonucleotide (ASO) gapmers that hybridize to SYNGAP1-AS and promote RNaseH-mediated depletion of SYNGAP1-AS. When delivered to a patient with Syngap haploinsufficiency, ASOs of the invention prevent miRNA from downregulating synthesis of SynGAP protein and/or mitigate negative effects associated with the 5' UTR and/or deplete SYNGAP1-AS lncRNAs that interfere with expression.

Where otherwise untreated Syngap haploinsufficiency may lead to a deficit of the expressed protein during neurodevelopment, treatment with a composition of the invention increases production of functional SynGAP protein from the non-mutant allele. The increase of SynGAP protein results in a healthy phenotype despite the haploinsufficient genotype. Thus, compositions of the invention are useful to treat or prevent the development of Syngap haploinsufficiency or its symptoms and related conditions. Treatment may be delivered upon detection of any symptoms or on detection, e.g., by genetic screening, of the haploinsufficiency.

Without being bound by any mechanism of action, it may be that miRNAs bind to sequences within a pre-mRNA or mRNA, such as a 3' UTR of an mRNA. This sequence-specific binding may induce translational repression, RNA cleavage, mRNA deadenylation, or mRNA decapping. In compositions of the invention, ASOs include a nucleotide sequence that may either bind the ASO to the SYNGAP mRNA or to the miRNA and prevent or inhibit miRNA-mediated translational repression. Preferably the ASOs bind to the SYNGAP mRNA and may sterically block the miRNA from binding to its normal target site.

In certain aspects, the invention provides a composition that includes at least one nucleic acid that promotes expression of a SynGAP protein from a transcript of the SYNGAP gene and has at least 80% sequence similarity to one of SEQ ID Nos: 1-29. The nucleic acid may have a length between about 10 and about 30 bases. Preferably, the nucleic acid has a region of at least about 10 contiguous bases with a 100% match to a segment within one of SEQ ID Nos: 1-29. For steric blocking oligonucleotide (SBO) embodiments, a majority of the bases of the nucleic acid may have a 2'-O-methoxyethylmodified ribose. In some embodiments, at least a majority of inter-base linkages in the nucleic acid are phosphorothioate bonds. In certain embodiments, all of the bases in the nucleic acid comprise 2'-O-methoxyethyl ribose sugars. In certain specific embodiments the nucleic acid has at least 88% sequence similarity to one of SEQ ID Nos: 1-29 and all of the bases in the nucleic acid comprise 2'-O-methoxyethyl ribose sugars. For example, the nucleic acid may have at least 94% sequence similarity to one of SEQ ID Nos: 1-29 in which all of the bases in the nucleic acid comprise 2'-O-methoxyethyl ribose sugars, optionally with at least about 90% of inter-base linkages in the nucleic acid being phosphorothioate bonds. The nucleic acid may have 100% sequence similarity to one of SEQ ID Nos: 1-29; all of the bases in the nucleic acid may comprise 2'-O-methoxyethyl ribose sugars; all instances of U and C may be methylated at position 5 of a nitrogenous base; and all inter-base linkages in the nucleic acid may be phosphorothioate bonds.

In miRNA-blocking aspects, the nucleic acid has a sequence at least 90% similar to one of SEQ ID NO: 1-10 and blocks an miRNA from binding to the transcript. Preferably, the nucleic acid binds within a 3' untranslated region (UTR) of a SYNGAP1 transcript and prevents binding of the miRNA, wherein the miRNA is a member of the hsa-miR-29-3p family. For example, the miRNA may be hsa-miR-29c-3p, hsa-miR-29b-3p, or hsa-miR-29a-3p and the nucleic acid may hybridize to a location within bases 4520-4526 of the transcript, wherein the transcript is given by NCBI reference sequence NM_006772.3. Or, in a related example, the miRNA is hsa-miR-1343-3p or hsa-miR-6783-3p and the nucleic acid hybridizes to a location within bases 4479-4485 of the transcript given by NCBI reference sequence NM_006772.3. Preferably, the nucleic acid is a steric blocking oligonucleotide (SBO).

In secondary structure/cryptic ORF aspects, the nucleic acid has a sequence at least 90% similar to one of SEQ ID NO: 11-20 and promotes expression by destabilizing a secondary structure or masking a cryptic open reading frame (ORF) in a 5'UTR of the transcript. The composition may include a plurality of the nucleic acids, each with a sequence at least 90% similar to one of SEQ ID Nos: 11-20. For example, the composition may include five or more of the nucleic acids. Preferably the 5 nucleic acids hybridize to locations distributed across a 5' UTR of the transcript. The composition may include, e.g., all ten nucleic acids described by SEQ ID Nos. 11-20, wherein the 10 nucleic acids tile across substantially all of the 200nt of the 5' UTR.

In anti-sense lncRNA aspects, the nucleic acid has a sequence at least 90% similar to one of SEQ ID NO: 21-29 and mediates digestion of a long, non-coding RNA antisense to the transcript. For example, the composition may include one or a plurality of nucleic acids, each having a base sequence at least 94% identical to one of SEQ ID NOs: 21-29, wherein each of the nucleic acids has a gapmer structure that comprises a central DNA segment flanked by modified RNA wings. Preferably the nucleic acids comprise two wings flanking a central region of at least 8 or 9 DNA bases. Either end of the nucleic acids may include modified RNA bases (e.g., 2'-O-methoxyethyl RNA). In certain embodiments, the nucleic acids has a base sequence with at least a 94% match to one of SEQ ID NO: 21-29, in which at least the outer-most inter-base linkages and all linkages involving a DNA base are phosphorothioate, and in which the oligonucleotide further comprises a central 12 DNA bases flanked by a 5' RNA wing and a 3' RNA wing, the 5' wing and the 3' wing each comprising 4 consecutive 2' modified RNA bases (a "4-12-4" gapmer structure; a "5-10-5" or similar gapmer structure is equally within the scope of the disclosure). Preferably the nucleic acid has the sequence of one of SEQ ID NO: 21-29 and in which both RNA wings consist of four 2-methoxyethyl-modified RNA bases. The composition may include a plurality of the nucleic acids, e.g., that tile along the long, non-coding RNA antisense to the transcript.

DETAILED DESCRIPTION

Figure 1:
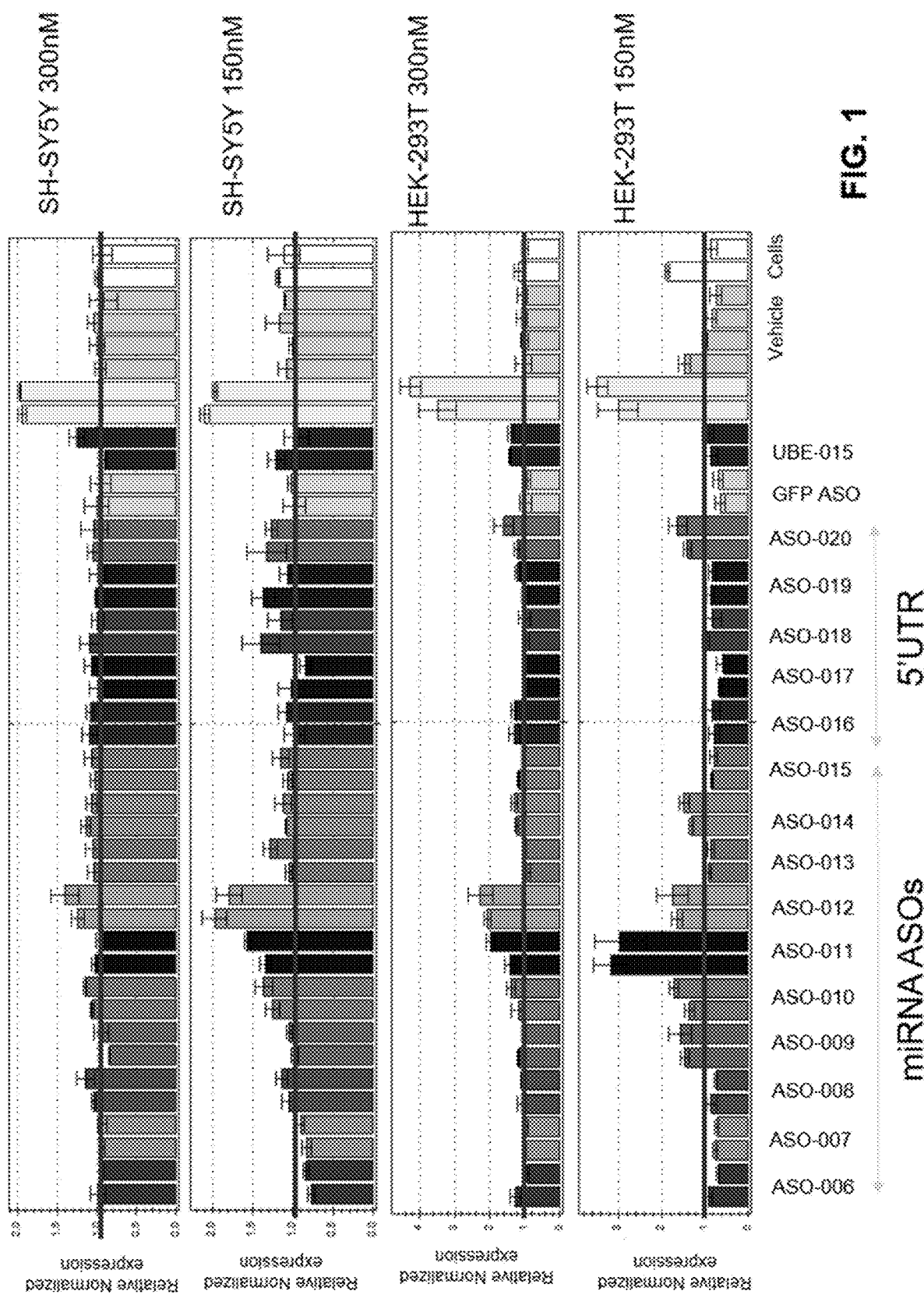
FIG. 1 shows SYNGAP1 transcript expression across ASO-treated samples.

The invention provides antisense oligonucleotides (ASOs) useful to treat SYNGAP1-related intellectual disability (SYNGAP1-ID). SYNGAP1-ID is characterized by developmental delay (DD) or intellectual disability (ID) (100% of affected individuals), generalized epilepsy (~84%), and autism spectrum disorder (ASD) and other behavioral abnormalities. The disorder results from an autosomal dominant disease mechanism, typically caused by de novo mutations. Penetrance is understood to be 100% and mutations may include deletions, nonsense, frameshift and missense. The majority of mutations are nonsense, truncating or frameshift, including several early truncating mutations. This and the presence of deletions has led to the designation of a haploinsufficiency disease mechanism.

To date, numerous individuals with SYNGAP1-ID have been reported. In the majority DD/ID was moderate to severe; in some it was mild. The epilepsy is generalized; a subset of individuals with epilepsy has myoclonic astatic epilepsy (Doose syndrome) or epilepsy with myoclonic absences. Compositions of the invention are useful to treat those conditions by boosting or restoring SYNGAP expression.

Behavioral abnormalities can include stereotypic behaviors (e.g., hand flapping, obsessions with certain objects) as well as poor social development. Feeding difficulties can be significant in some. The occurrence of ASD could be as high as 50%. In addition, inattention, impulsivity, self-directed and other-directed aggressive behavior, elevated pain threshold, hyperacusis, and sleep disorders have been observed.

The invention provides disease-specific or disease modifying treatments for SYNGAP1 neurodevelopmental disorder, and thus addresses an unmet need.

The SYNGAP gene encodes the SynGAP protein—a synaptically-enriched enzyme that plays an important role in synaptic physiology and synaptic plasticity and expression of this protein is highest in the central nervous system (CNS). SynGAP is a Ras and RapGAP—meaning it inhibits function of ras and rap by promoting hydrolysis of bound GTP. In healthy neurons, SynGAP is primarily located in the postsynaptic density (PSD) under baseline activity conditions. Upon increased neuronal activity, SynGap is phosphorylated by CaMKII, decreasing affinity for the PSD and allowing SynGAP to disperse from the postsynaptic density, disinhibiting ras signaling and allowing for dendritic spine morphology changes and AMPAR insertion associated with long-term potentiation (LTP). This process is NMDAR activation-dependent.

Animal models of SYNGAP1 mutations have disease-relevant behavioral phenotypes including memory dysfunction. The loss of SynGAP inhibition of ras/rap is thought to contribute to impairments in synaptic development, spinogenesis, and disrupted synaptic signaling and plasticity.

SynGAP regulates synaptic strength and mitogen-activated protein kinases (MAPK) in cultured neurons implicating roles in AMPAR activity and NMDAR/MAPK signaling. It is understood that SynGAP plays a critical role in the regulation of neuronal MAPK signaling, AMPAR membrane trafficking, and excitatory synaptic transmission. SYNGAP activity decreases ERK activation; depresses AMPAR-mediated miniature excitatory postsynaptic currents, reduces synaptic AMPAR surface expression, and decreases the insertion of AMPARs into the plasma membrane. See Rumbaugh, 2006, SynGAP regulates synaptic strength and mitogen-activated protein kinases in cultured neurons, PNAS 103 (12): 4344-51, incorporated by reference.

Rapid dispersion of SynGAP from synaptic spines triggers AMPA receptor insertion and spine enlargement during long-term potentiation (LTP) with implications in PSD compartmentalization/regulation. Application of N-methyl-D-aspartate (NMDA) promotes movement of SynGAP-α1 as well as SynGAP-α2 out of the PSD core. SynGAP is rapidly dispersed from spines upon LTP induction in hippocampal neurons and depends on phosphorylation of SynGAP by CaMKII (calmodulin-dependent protein kinase II). The degree of acute dispersion predicts the maintenance of spine enlargement. Thus, the synaptic dispersion of SynGAP by CaMKII phosphorylation during LTP represents a key signaling component that transduces CaMKII activity to small G protein-mediated spine enlargement, AMPA receptor synaptic incorporation, and synaptic potentiation. See Araki, 2015, Rapid Dispersion of SynGAP from Synaptic Spines Triggers AMPA Receptor Insertion and Spine Enlargement during LTP, Neuron 85 (1): 173-189, incorporated by reference.

The invention provides compositions that promote SynGAP expression. As discussed herein, effects of compositions of the disclosure may be assays or demonstrated by various techniques including rt-PCR, qPCR, RNA-Seq, optogenetics, patch clamp, and others.

For example, compositions of the invention and their effects may be assessed with an Optopatch assay. Generally, Optopatch includes the use of in vitro neurons that include optogenetic constructs that provide neural activation under optical stimulus (e.g., a modified algal channelrhodopsin that causes the neuron to fire in response to light) and optical reporters of neural activity (modified archaerhodopsins that emit light in proportion to neuronal membrane voltage and yield signals of neuronal activity). The in vitro neurons may be assayed in a fluorescence microscopy instrument, and may also be (e.g., subsequently) evaluated by e.g., staining (e.g., immunocytochemistry), RNA-Seq, or other such assay. Any suitable optogenetic constructs, optogenetic microscope, or other assays may be used. For example, suitable optogenetic constructs include those described in U.S. Pat. No. 9,594,075, incorporated by reference. Suitable optogenetic microscopes include those described in U.S. Pat. No. 10,288,863, incorporated by reference. Compositions of the invention and their effects may be assessed using iPSC-derived neuronal cell lines with mutations in the SYNGAP gene (both heterozygous and homozygous loss-of-function mutations). Optopatch phenotyping is being performed on such cell lines.

To provide compositions and methods of the invention, sequences for ASOs may be selected by a process that includes balancing various factors such as: 1. determine target transcript regions and generate sequences (all possible N-mers); 2. exclusion based on experimental constraints (isoforms, homology); 3. exclusion based on predicted off-target mRNA, pre-mRNA, miRNA, and lncRNA hits in humans and non-human primates (rhesus and cynomolgus macaque); 4. exclusion/filtering based on sequence characteristics (tetra-G, tetra-C, CpG, palindromes, GC content, and poly-X stretches); 5. filter based on thermodynamic parameters (Tm, hairpin ΔG, ASO duplex ΔG, ASO: target ΔG); and 7. choose ASOs within regions based on thermodynamic parameters, spacing, and experimental goals (Overall ΔG). To determine target transcript regions, criteria may be applied from literature, sequencing-based assays, and models to identify miRNA binding sites to block. For miRNA steric blocking oligonucleotides (SBOs), for targets passing the criteria, 7-8nt predicted miRNA binding sites are identified based on seed sequence and a model that includes a variety of contextual information. Conserved sites are more likely to be functional/relevant.

Identifying targets to address with compositions of the invention may be performed using any suitable technique or combination of techniques. Preferred embodiments have used CLIP-Seq, TargetScan, and miRNA atlases as tools for identifying targets and designing sequences of the invention.

Cross-linking immunoprecipitation (CLIP) uses UV cross-linking and immunoprecipitation in order to analyze RNA interactions and modifications and has been used with sequencing (dubbed CLIP-Seq) to generate genome-wide RNA interaction maps and for the identification of microRNA targets by decoding microRNA-mRNA and protein-RNA interaction maps in tissue and cell cultures and samples. See Thomson, 2011, Experimental strategies for microRNA target identification, Nucleic Acids Res 39 (16): 6845-53, incorporated by reference.

TargetScan is a digital tool that predicts biological targets of miRNAs by searching for the presence of conserved 8mer, 7mer, and 6mer sites that match the seed region of each miRNA. See Lewis, 2005, Conserved Seed Pairing, Often Flanked by Adenosines, Indicates that Thousands of Human Genes are MicroRNA Targets., Cell 120:15-20, incorporated by reference. TargetScan may be used to identify conserved sites, poorly conserved sites, and sites with mismatches in the seed region that are compensated by conserved 3' pairing, and centered sites. See Friedman, 2009, Most mammalian mRNAs are conserved targets of MicroRNAs, Genome Res 19:92-105 and Shin, 2010, Expanding the microRNA targeting code: functional sites with centered pairing, Mol Cell 38 (6): 789-802, both incorporated by reference. TargetScan ranks predictions based on the predicted efficacy of targeting as calculated using cumulative weighted context++ scores of the sites. Predictions may also be ranked by their probability of conserved targeting. TargetScanHuman considers matches to human 3' UTRs and their orthologs, as defined by UCSC whole-genome alignments. Conserved targeting has also been detected within open reading frames (ORFs).

There are atlases of miRNAs. For example, The Human miRNA Tissue Atlas is a catalog of tissue-specific microRNA (miRNA) expression across 62 tissues. See Ludwig, 2016, Distribution of miRNA expression across human tissues, Nucleic Acids Res 44 (8): 3865-77, incorporated by reference. Another example is the integrated expression atlas of miRNAs and their promoters that was created by deep-sequencing 492 short RNA (sRNA) libraries, with matching Cap Analysis Gene Expression (CAGE) data, from 396 human and 47 mouse RNA samples. See de Rie, 2017, An integrated expression atlas of miRNAs and their promoters in human and mouse, Nat Biotech 35:872-878, incorporated by reference. For that 2017 atlas, promoters were identified for 1,357 human and 804 mouse miRNAs and showed strong sequence conservation between species. It was found that primary and mature miRNA expression levels were correlated, allowing the primary miRNA measurements to be used as a proxy for mature miRNA levels in a total of 1,829 human and 1,029 mouse CAGE libraries. Such tools provide an atlas of miRNA expression and promoters in primary mammalian cells, establishing a foundation for detailed analysis of miRNA expression patterns and transcriptional control regions. Such miRNA atlases may be used to identify targets of the invention.

The invention provides compositions that employ one of several SYNGAP1 boosting strategies. First, the disclosure provides 10 different sequences (SEQ ID Nos. 11-20) for use in miRNA-blocking steric blocking oligonucleotides (SBOs). Bioinformatics analysis identified a promising CLIP-seq peak in 3' UTR of SYNGAP1 with a binding site for members of the hsa-miR-29-3p family that are expressed in the human cortex. Sequences tiling the CLIP-seq peak were designed to block interactions between miRNA and this site, including SBOs that fully occlude the most promising miRNA binding site, with the goal of removing miRNA-mediated negative regulation of SYNGAP1 levels.

Table 1 gives the sequences for SEQ ID Nos. 1-29.

Second, the disclosure provides 9 different sequences (SEQ ID Nos. 21-29) for gapmers targeting SYNGAP1-AS1. There is some evidence in the literature that SYNGAP1 levels in the brain are anticorrelated with a short lncRNA antisense to SYNGAP1. Designed 20mer gapmers tiling this transcript.

Finally, third, the disclosure provides 10 different sequences (SEQ ID Nos. 1-10) for SBOs tiling the 5' UTR. It is understood that the SYNGAP transcript may include novel regulatory features such as secondary structures or upstream open reading frames. Others have tiled noncoding regions of target transcripts to stabilize mRNA levels and boost protein expression for other genes. This disclosure provides 10 sequences tiling much of the 200nt 5' UTR of the SYNGAP transcript to promote expression.

Compositions of the disclosure embody results from identifying miRNA binding sites to block. Efforts to identify miRNA binding sites may include numerous avenues of inquiry including, for example, 1. AGO2 CLIP-seq; 2. TargetScan; and 3. studies of miRNA in CNS. Here, AGO2 CLIP-seq identified 50-80nt regions with evidence for interaction between silencing complex and target transcript in human adult or developing cortex. CLIP-Seq has identified 2 peaks in SYNGAP transcript, one intronic, one in a 3' UTR. See Nowakowski, 2018, Regulation of cell-type-specific transcriptomes by microRNA networks during human brain development, Nat Neurosci 21 (12): 1784-1792, incorporated by reference. Additionally, TargetScan was used to predict 7-8nt miRNA binding sites, predicted based on seed sequence and a model that includes a variety of contextual information. Conserved sites are more likely to be functional/relevant. TargetScan identified possible miRNA binding sites that are at least well conserved or confidently annotated. For example, TargetScan identified a well conserved site at bases 4520-4526 of the transcript, wherein the transcript is given by NCBI reference sequence NM_006772.3 and it is theorized that hsa-miR-29c-3p, hsa-miR-29b-3p, or hsa-miR-29a-3p may bind here. TargetScan identifies a location that is well annotated at bases 4479-4485 of the transcript, wherein the transcript is given by NCBI reference sequence NM_006772.3 and it is theorized hsa-miR-1343-3p and hsa-miR-6783-3p may bind there. See McCall, 2017, Toward the human cellular microRNAome, Genome Res 27(10):1769-1781, incorporated by reference. Finally, research in miRNA in CNS gives evidence that miRNA is expressed in adult cortex (Boudreau et al. 2014 Neuron), developing cortex (Nowakowski et al. 2018 Nature Neuroscience), and/or CNS tissues from a miRNA atlas (McCall et al. 2017 Genome Research).

The disclosure uses those insights and provides 10 sequences for SBOs that tile the CLIP-seq Peak and miRNA Binding Site. The design process generally includes: starting with all 16-21mers targeting the CLIP-seq peak; removing sequences with disqualifying off-target hits in any human reference (disqualifying criteria may include: edit distance <2, no contiguous match length filter); requiring GC content: 45-75% GC; requiring certain thermodynamic parameters: Duplex DG<−23 (standard), hairpin DG>−5 (normally −2.5), dimer DG>−10 (normally −8); for sequences completely occluding the miRNA binding site: Shortest ASOs without CpG or without GGGG motifs and for other sequences: Shortest sequences with best thermodynamic properties and lowest incidence of problematic motifs that tile the interval. Those processes provided SEQ ID Nos. 11-20, each of which is useful to create a steric blocking oligonucleotide (SBO) useful to prevent miRNA from binding to a SYNGAP1 transcript.

In certain embodiments, the disclosure provides sequences useful in creating antisense oligonucleotides that disrupt secondary structures or cryptic open reading frames in a SYNGAP1 transcript. Stable 5' secondary structures can reduce translation efficacy.

The 5' UTR of the SYNGAP1 transcript, NM_006772.3, is short (200nt) and therefore amenable to tiling. Using a tiling approach, the present Inventors empirically discovered regulatory sites in the 5' UTR of the SYNGAP1 transcript, despite no prior indication of hairpins and/or uORFs.

Accordingly, the disclosure provides 10 sequences useful in ASOs (e.g., SBOs) that tile across the 5' UTR of the SYNGAP1 transcript. The invention likewise provides methods for tiling to empirically discover regulatory sites in a 5' of the SYNGAP1 transcript for designing ASO sequences.

In certain methods, the sequences are designed by a process that includes: starting with all 16-21mers targeting the 200nt 5'UTR; eliminating off-target hits (e.g., other exact matches in the human spliced or unspliced transcriptome, no edit distance 1 hits in human spliced transcriptome); omitting sequence liabilities (e.g., No poly-X stretches >5, no palindromes >8); requiring certain standard thermodynamic parameters (e.g., Duplex DG<−23, hairpin DG >−2.5, dimer DG >−8); and minimizing GGGG motifs and CpG dinucleotides. The design process provided SEQ ID Nos: 1-10.

In other embodiments, a long, non-coding RNA (lncRNA) that is understood to be antisense to a SYNGAP1 transcript (SYNGAP1-AS) is degraded using an antisense gapmer of the disclosure, such an antisense oligonucleotide with a sequence at least about 75% similar to one of SEQ ID Nos. 21-29. Some antisense RNAs overlapping suspected autism spectrum disorder (ASD) genes are thought to exhibit concordant expression relative to their sense protein-coding genes, while other sense-antisense pairs demonstrate a discordant relationship. At least one antisense RNA corresponding to the SYNGAP1 locus (SYNGAP1-AS) has been found to be differentially expressed in brain regions of patients with ASD compared to control individuals and is here targeted for gapmer-mediated degradation. See Velmeshev, 2013, Expression of non-protein-coding antisense RNAs in genomic regions related to autism spectrum disorders, Molecular Autism 4: article 32, incorporated by reference. The disclosure provides 9 sequences (SEQ ID NOs. 21-29) useful in gapmers targeting SYNGAP1-AS1 (496nt ENST00000630418.1). Those are designed by a process that includes: starting with all 20mers tiling the transcript; removing sequences with disqualifying off-target hits (e.g., no edit distance<2 or match length>17 hits in human transcriptome); removing sequences with known liabilities (e.g., no poly-X stretches>5, no palindromes>8, no GGGG, % GC 45-75; no CpG unless at 5' end of transcript); applying preferred gapmer thermodynamic parameters (e.g., Duplex DG<−23, hairpin DG>−2.5, dimer DG>−8, Tm>67).

To summarize certain particular boosting strategies, the disclosure employs at least three. First, compositions of the disclosure block miRNA binding. Those compositions include SBOs based on one of SEQ ID NOs 11-20, which tile across an identified CLIP-seq peak. Second, compositions of the disclosure mitigate negative regulatory effects of the 5'UTR of the SYNGAP transcript that may impede/interfere with translation. Those compositions include ASOs based on one of SEQ ID NOs. 1-10. Third and finally, compositions of the disclosure provide ASO gapmers that mediate the digestion of antisense lncRNAs. Specifically, those compositions include gapmers targeting SYNGAP1-AS1 (an isoform profiled in Velmeshev 2013 Molecular Autism) based on SEQ ID NOs. 21-29.

Table 1 give sequences for ASOs of the disclosure.

TABLE 1

Sequences

| CODE | SEQ ID | Sequence | Target |
| --- | --- | --- | --- |
| ASO-006 | SEQ ID NO: 1 | CCAACGGCAGCAGCGGC | 5'UTR |
| ASO-007 | SEQ ID NO: 2 | AGGAGAATAAGAGCCAA | 5'UTR |

TABLE 1-continued

Sequences

| CODE | SEQ ID | Sequence | Target |
| --- | --- | --- | --- |
| ASO-008 | SEQ ID NO: 3 | GAGAGGAGCAGAGAGAAGC | 5'UTR |
| ASO-009 | SEQ ID NO: 4 | GGGACGGGGAGAAAGAAG | 5'UTR |
| ASO-010 | SEQ ID NO: 5 | GGAGGAGGAGGAGAATAAGAG | 5'UTR |
| ASO-011 | SEQ ID NO: 6 | CAGAGAGGAGGAGAGAGGAGG | 5'UTR |
| ASO-012 | SEQ ID NO: 7 | AGAGAGGAGGAGAGAGGAGCA | 5'UTR |
| ASO-013 | SEQ ID NO: 8 | GGGAGAAAGAGGGGGAGAAGG | 5'UTR |
| ASO-014 | SEQ ID NO: 9 | AGAAAGAAGAGAGAAAGAGGG | 5'UTR |
| ASO-015 | SEQ ID NO: 10 | GGAGAAAGAAGAGAGAAAGAG | 5'UTR |
| ASO-016 | SEQ ID NO: 11 | GATAGCACCCCGGAGT | miRNA |
| ASO-017 | SEQ ID NO: 12 | GGATAGCACCCCGGAGT | miRNA |
| ASO-018 | SEQ ID NO: 13 | GAGGATGGGGATAGCACCC | miRNA |
| ASO-019 | SEQ ID NO: 14 | AGAGGATGGGGATAGCACCC | miRNA |
| ASO-020 | SEQ ID NO: 15 | CAGAGGATGGGGATAGCACC | miRNA |
| ASO-021 | SEQ ID NO: 16 | CAGAGGATGGGGATAGCAC | miRNA |
| ASO-022 | SEQ ID NO: 17 | TGAGGCAGAGGATGGGGATA | miRNA |
| ASO-023 | SEQ ID NO: 18 | CGGAGTGAAGGGGTCTGTAC | miRNA |
| ASO-024 | SEQ ID NO: 19 | TACGGGGTAGGCGGTGTC | miRNA |
| ASO-025 | SEQ ID NO: 20 | GGTGTCCTGGGGCAAGGGTC | miRNA |
| ASO-026 | SEQ ID NO: 21 | AGGACTTCAGCAGCTCCCCG | lncRNA |
| ASO-027 | SEQ ID NO: 22 | CCCTGCCTCTCGGTCCTCTG | lncRNA |
| ASO-028 | SEQ ID NO: 23 | GGGTGCTACACTTAATCACC | lncRNA |
| ASO-029 | SEQ ID NO: 24 | GCATCATTGGCAGGTGAGGG | lncRNA |
| ASO-030 | SEQ ID NO: 25 | AGCATCATTGGCAGGTGAGG | lncRNA |
| ASO-031 | SEQ ID NO: 26 | GATTCCCAGATCAAGAGCAT | lncRNA |
| ASO-032 | SEQ ID NO: 27 | AGCAGGCAGAGAAGGATTCC | lncRNA |
| ASO-033 | SEQ ID NO: 28 | GCTGCTGTCCCAGGAAGAAC | lncRNA |
| ASO-034 | SEQ ID NO: 29 | GCTGGCCTCTTCTTAGTTTG | lncRNA |

The sequences listed in Table 1 may be treated as a baseline reference, and a nucleic acid (e.g., a steric blocking oligonucleotide or SBO, or a gapmer) in a composition of the invention may be described in comparison to one of the listed sequences. For example, it may be found that mismatches are tolerated, meaning that even where the SYNGAP1 transcript includes a reverse complement to one of SEQ ID Nos 1-29, the nucleic acid of the invention functions well even when it is less than a 100% match to one of the SEQ ID Nos 1-29. Results suggest that mismatches are best tolerated near the ends of the SBO and also that it may be most critical to block a binding region of a miRNA seed sequence, where the seed may be about 7 to 8 bases long, or even as short as 5 or 6.

It is also noted that the certain characters used in Table 1 are presented within the sequences using DNA nomenclature (e.g., using the letters A, T, C, and G) and are silent as to ribose sugar composition, nitrogenous base modifications, or inter-base linkages. It may be found that the nucleic acid of the invention is most useful with RNA bases (e.g., uracil for the nitrogenous base where T is shown) and also or alternatively with modified ribose sugars (e.g., 2'-MOE). In fact, it may be found that the letter T in a listed sequence can be present in a nucleic acid of the invention as the nucleobase thymine or uracil and/or even that those bases can be mixed or intermingled along the SBO. In some embodiments, a nucleic acid of the invention includes 2'-MOE "methylated" U (5-methyluridine), which in essence is a 2'-MOE-T.

In particular, 2'-MOE bases may use 5-methyl cytosine and 5-methyl uridine. It may be preferable to use 5-methyl cytosine to avoid non methylated CpG. It may be found that avoiding non-methylated CpG decreases or avoids inflammatory potential. Additionally, 5-methyl cytosine 2'-MOE bases may be found to be aligned with clinically validated chemistry and may optionally be preferred for such a reason. The 5-methyl-U (T) bases may be used with 2'-MOE chemistry for ease of manufacturing and commercial availability. For sequences using 2'-OMe chemistry, ease of manufacturing and/or commercial availability may favor not using 5-methyl C and/or 5-methly-U (T).

In certain embodiments, a majority or all of the bases represented by the letter T have the nucleobase uracil. In preferred embodiments, a majority or all of the bases represented by the letter T have a 2'-MOE-T. Any, most, or all of the linkages may be phosphorothioate. A preferred embodiment uses all phosphorothioate linkages for SEQ ID Nos 1-20. The preferred embodiment may include some PO linkages. This appears to be the case for the wings in gapmers, and for the 2'-MOE SBOs, some PO linkages may also be preferred, in each case to lower the protein binding.

In fact, one first embodiment provides a composition with a nucleic acid for use as an ASO to promote SYNGAP expression. The nucleic acid has a base sequence with an at least 88% match to one of SEQ ID Nos 1-29 (i.e., no greater than two mismatches). All of the nitrogenous bases are A, T, U, C, or G, optionally with mC. Optionally, all of the sugars are 2'-MOE for SEQ ID Nos: 1-29 and all of the linkages are PS for SEQ ID Nos: 1-29. These first embodiments are attractive for ease of manufacture. Such ASOs can be synthesized on standard benchtop RNA-synthesis systems and/or ordered from commercial vendors.

Stated more generally, preferably at least about 6 to 12 contiguous bases in the nucleic acid have at least 90% sequence identity to a corresponding 12 contiguous bases in one of SEQ ID Nos: 1-29 (to stably bind to target). Preferably at least about 6 to 12 contiguous bases in the nucleic acid have at least 90% sequence identity to a corresponding 12 contiguous bases in one of SEQ ID Nos: 1-10 (e.g., to block the seed region of the implicated miRNA).

Preferably, for steric blocking oligonucleotides, a majority of the bases of the nucleic acid have a 2'-O-methoxyethyl-modified ribose (in SEQ ID Nos 1-29), a majority of inter-base linkages in the nucleic acid are phosphorothioate bonds (in SEQ ID Nos 1-29), and nitrogenous bases are A, T, U, C, G, or mC. As suggested above, SEQ ID Nos: 11-20 in Table 1 are specifically designed to block specific miR-NAs from downregulating SYNGAP transcripts; SEQ ID Nos: 1-10 are designed to mitigate potential negative regulatory effects of the 5'UTR or to augment SynGAP protein expression.

FIG. 1 shows SYNGAP transcript expression across ASO-treated samples (ASOs 006 to 020). All SYNGAP1-targeting ASOs were screened in-vitro by treating two cell lines of interest (HEK-293T and SH-SY5Y) at two concentrations. For HEK-293T cells, the cells were plated at 50K per well of a 96-well plate, with 150 nM and 300 nM of ASO. ASOs were delivered by transfection using RNAi Max at 0.75 uL per well of a 96-well plate. For SH-SY5Y cells, the cells were plated at 45K per well of a 96-well plate, with 150 nM and 300 nM of ASO. ASOs were delivered by transfection using RNAi Max at 0.5 uL per well of a 96-well plate. The data shown in FIG. 1 displays a summary table of qPCR readouts of SYNGAP1 transcript expression for the first 15 ASOs (out of 29 ASOs) screened in a primary screen. All samples were normalized to a vehicle condition. Cell only conditions shows no change in SYNGAP1 expression. A publicly disclosed SYNGAP-targeting boosting ASO (ASO-005) was used as a positive control and shows ~2-4× boosting of SYNGAP1 transcript. GFP-004 ASO and a UBE3A ASO-015 was used as a negative control and shows no boosting of SYNGAP1. The top two graphs show data for SYNGAP1 ASOs 006-020 screened in SH-SY5Y cells at 300 nM and 150 nM. The bottom two graphs show data for SYNGAP1 ASOs 006-020 screened in HEK-293T cells at 300 nM and 150 nM. The SH-SY5Y cells were transfected with ASOs 24-hours after plating and the HEK cells were transfected with ASOs at the time of plating. For both cell lines, cells were harvested for qPCR 48 hours after ASO transfection. GAPDH was used as the normalizing gene for SYNGAP1. Each ASO have two biological replicates indicated as two bars and each bar represents 2 technical replicates and 1 biological replicate.

Figure 2:
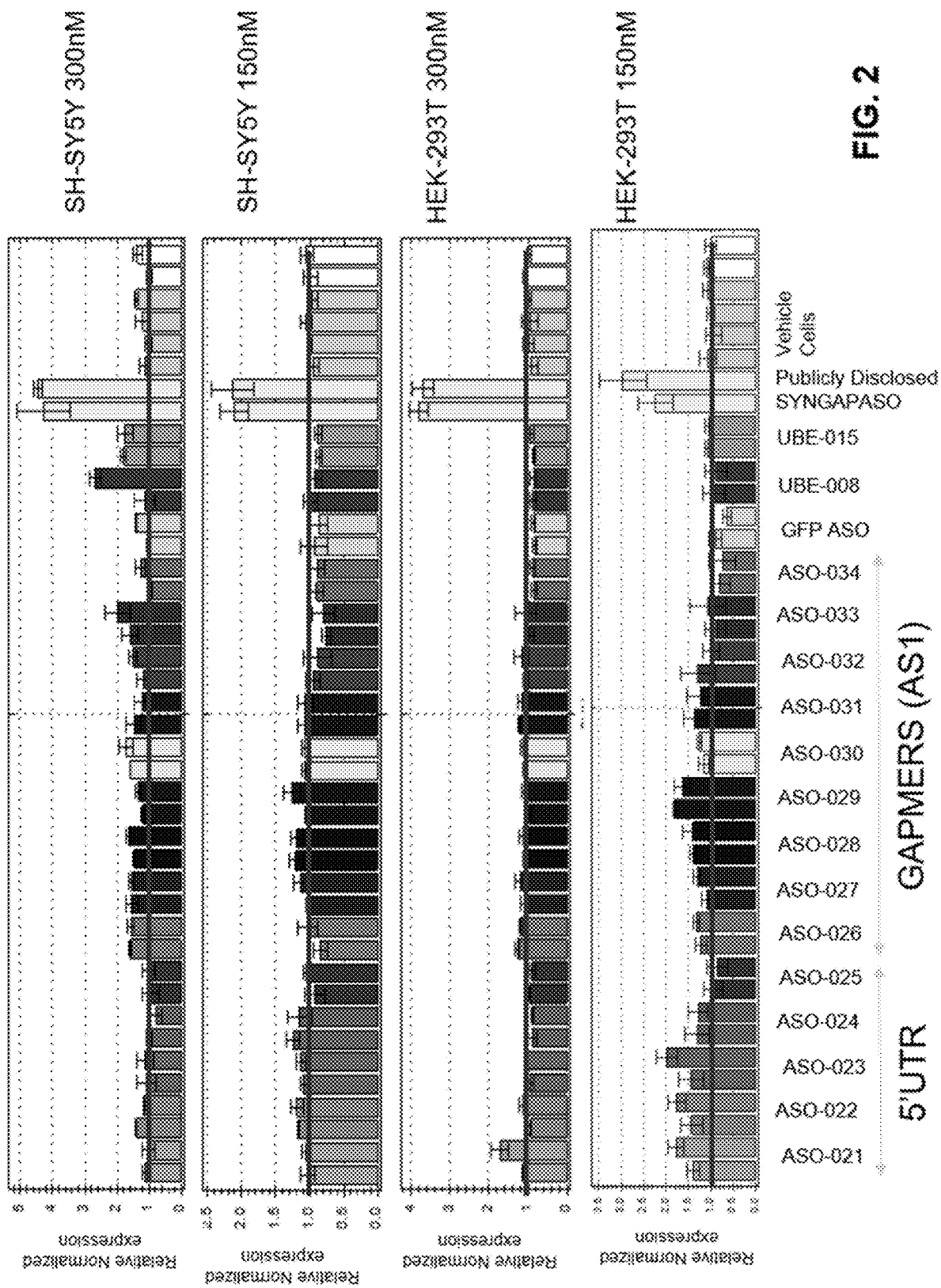
FIG. 2 shows SYNGAP1 transcript expression across ASO-treated samples.

FIG. 2 shows SYNGAP transcript expression across ASO-treated samples (ASOs 021 to 034). In FIG. 2, all SYNGAP1-targeting ASOs were screened in-vitro by treating two cell lines of interest (HEK-293T and SH-SY5Y) at two concentrations. For HEK-293T cells, the cells were plated at 50K per well of a 96-well plate, with 150 nM and 300 nM of ASO. ASOs were delivered by transfection using RNAi Max at 0.75 uL per well of a 96-well plate. For SH-SY5Y cells, the cells were plated at 45K per well of a 96-well plate, with 150 nM and 300 nM of ASO. ASOs were delivered by transfection using RNAi Max at 0.5 uL per well of a 96-well plate. The data shown in FIG. 2 displays a summary table of qPCR readouts of SYNGAP1 transcript expression for the second set of 14 ASOs (out of 29 ASOs) screened in the primary screen. All samples were normalized to a vehicle condition. Cell only conditions shows no change in SYNGAP1 expression. A publicly disclosed SYNGAP-targeting boosting ASO (ASO-005) was used as a positive control and shows ~2-4× boosting of SYNGAP1 transcript. GFP-004 ASO and a UBE3A ASO-008 and ASO-015 was used as a negative control and mostly show no significant boosting of SYNGAP1. The top two graphs show data for SYNGAP1 ASOs 021-034 screened in SH-SY5Y cells at 300 nM and 150 nM. The bottom two graphs show data for SYNGAP1 ASOs 021-034 screened in HEK-293T cells at 300 nM and 150 nM. The SH-SY5Y cells were transfected with ASOs 24-hours after plating and the HEK cells were transfected with ASOs at the time of plating. For both the cell lines, cells were harvested for qPCR 48 hours after ASO transfection. GAPDH was used as the normalizing gene for SYNGAP1. Each ASO condition have two biological replicates indicated as two bars and each bar represents 2 technical replicates and 1 biological replicate.

Figure 3:
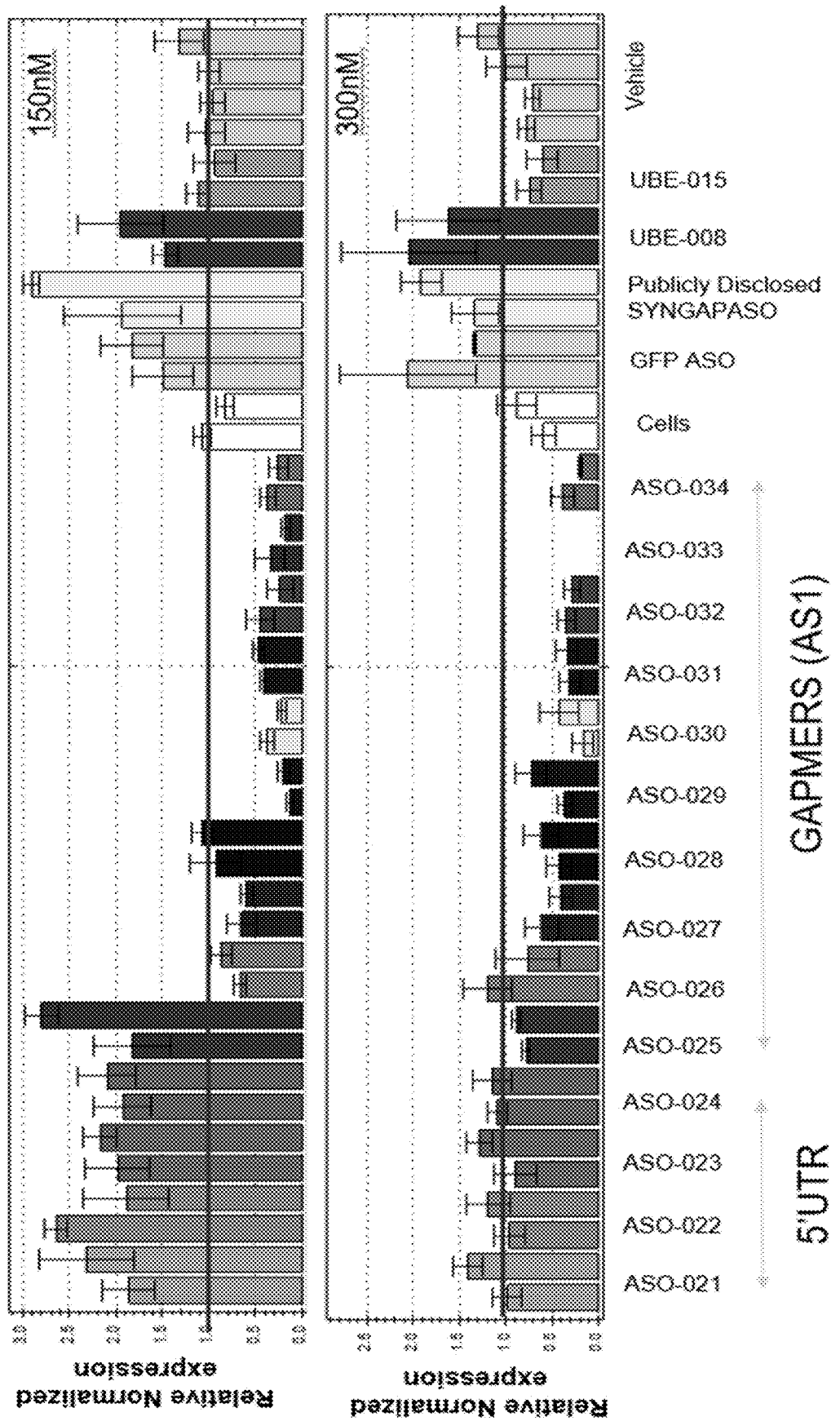
FIG. 3 shows knockdown of SYNGAP1-AS1 by ASOs of the disclosure.

FIG. 3 shows SYNGAP1 antisense transcript expression across relevant ASO-treated samples. For FIG. 3, all SYN-GAP1-AS targeting ASOs were screened in-vitro by treating two cell lines of interest (HEK-293T and SH-SY5Y) at two concentrations. The data shown are from SH-SY5Y cells. For SH-SY5Y cells, the cells were plated at 45K per well of a 96-well plate, with 150 nM and 300 nM of ASO. ASOs were delivered by transfection using RNAi Max at 0.5 uL per well of a 96-well plate. The data shown displays a summary plot of qPCR readouts of SYNGAP1-AS1 knockdown for the SYNGAP1-AS1 specific ASOs (along with a few neutral ASOs not targeting SYNGAP-AS1) screened in our primary screen. All samples were normalized to a vehicle condition. Cell only conditions (white) shows no change in SYNGAP1-AS1 expression. All neutral ASOs (SYNGAP ASOs 021-024, GFP-004 ASO, UBE3A ASO-008, ASO-015 and a publicly disclosed SYNGAP-targeting boosting ASO (ASO-005)) were used as negative controls and show no significant knockdown of SYNGAP1-AS1. The top graph shows data for SYNGAP1-AS1 ASOs 025-034 screened in SH-SY5Y cells at 150 nM. The bottom graph shows data for SYNGAP1 ASOs 025-034 screened in SH-SY5Y cells at 300 nM. The SH-SY5Y cells were transfected with ASOs 24-hours post plating, and the cells were harvested for qPCR 48 hours after ASO transfection. GAPDH was used as the normalizing gene for SYNGAP1-AS1. Each ASO condition has two biological replicates indicated as two bars and each bar represents 2 technical replicates and 1 biological replicate.

Figure 4:
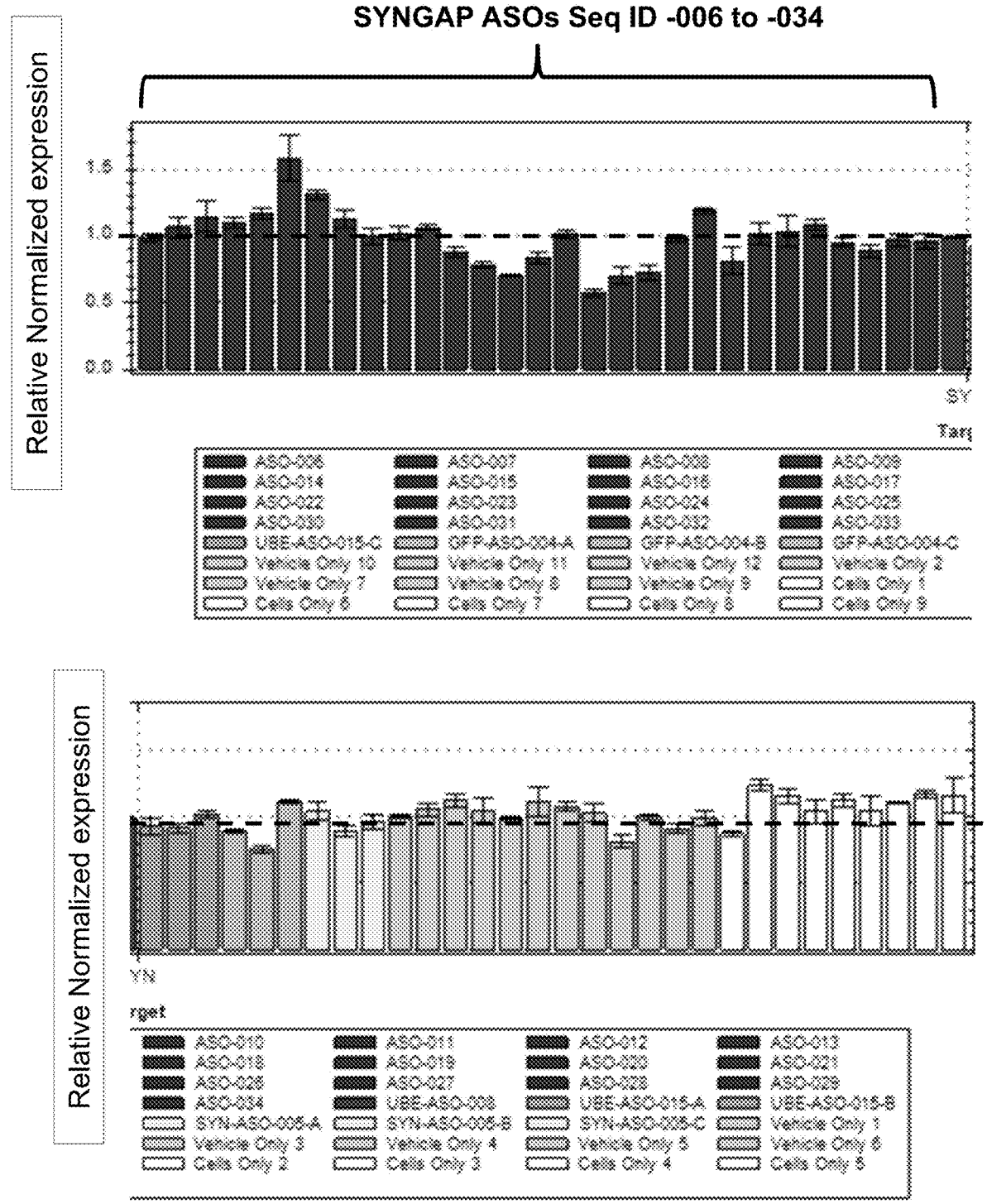
FIG. 4 shows SYNGAP1 expression with all ASOs in human NGN2 neurons.

FIG. 4 shows the results from screening of all SYNGAP1 ASOs in human NGN2 stem cell-derived neurons. SYNGAP1 is a post synaptic GTPase activating protein that negatively regulates small GTPases and is critical for the development of cognition and proper synapse function and is highly expressed in human neurons. For FIG. 4, to show that the ASOs of the invention are effective in a relevant human cell type, human induced pluripotent stem cell-derived neurons (differentiated via NGN2 overexpression and dual SMAD inhibition) were treated with SYNGAP1 ASOs, as described herein. Neurons were plated at 35k per well on a 96-well plate and treated with 200 nM SYNGAP1 ASO. ASOs were transfected into neurons with Endoporter reagent on DIV 20. Cells were harvested for qPCR and Western Blot 10 days after treatment on DIV30. The data shown in FIG. 4 displays a graph of qPCR readouts of SYNGAP1 boosting for 29 SYNGAP1 ASO candidates screened in a primary screen. All samples were normalized to a vehicle condition. Cell only conditions shows no change in SYNGAP1 expression. SYNGAP1 expression levels were normalized to Actin (used as a housekeeping gene). All normalized expression was then quantified relative to the first vehicle condition. Each bar represents 2 technical replicates and 1 biological replicate.

Figure 5:
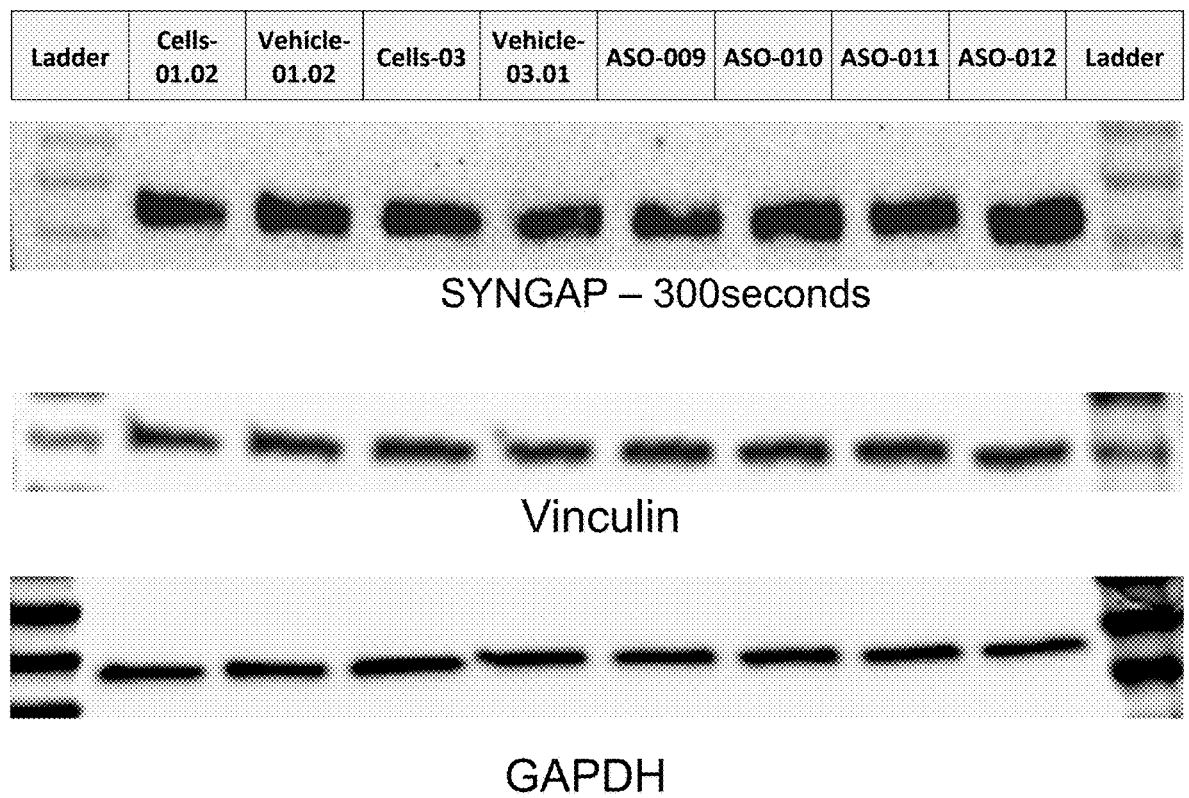
FIG. 5 is a western blot for ASO candidates ASO-009-ASO-012.
Figure 6:
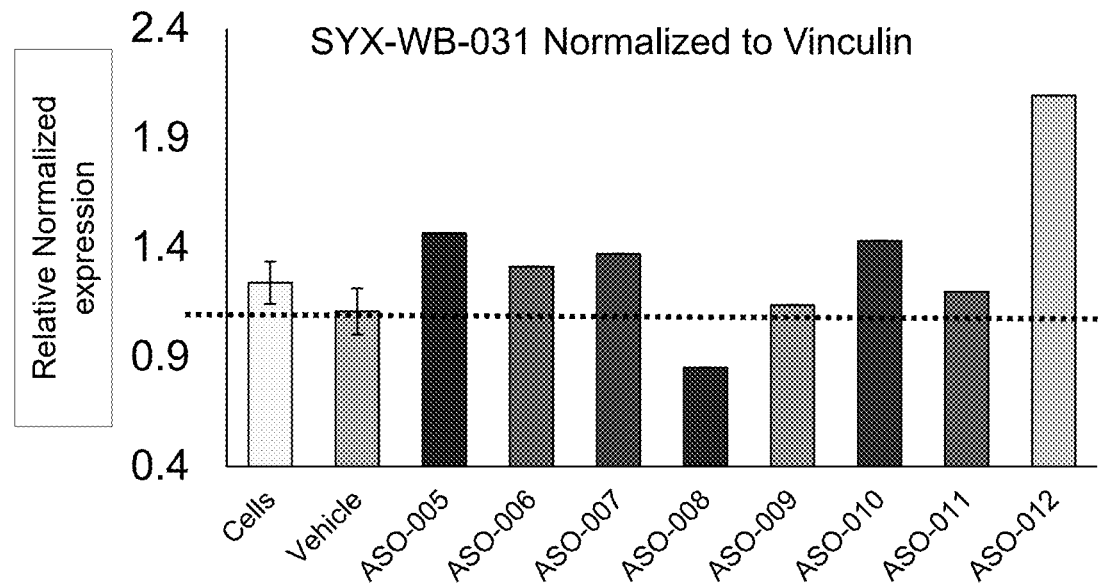
FIG. 6 shows SynGAP protein boosting for several of the ASOs normalized to vinculin.
Figure 7:
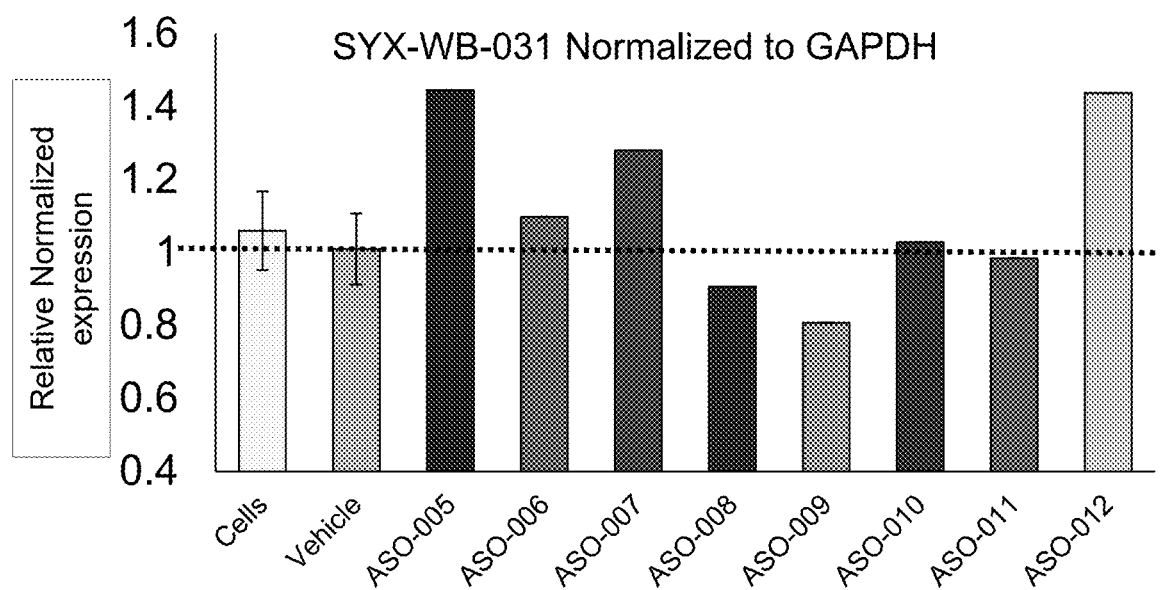
FIG. 7 shows SynGAP protein boosting for ASOs normalized to GAPDH.

FIGS. 5-7 give example data of SynGAP protein boosting using SYNGAP1 ASOs. Human induced pluripotent stem cell-derived neurons (differentiated via NGN2 overexpression and dual SMAD inhibition) were treated with SYNGAP1 ASOs and screening for SynGAP protein boosting using Western Blot. Neurons were plated at 35k per well on a 96-well plate and treated with 200 nM SYNGAP1 ASO. ASOs were transfected into neurons with Endoporter reagent (0.6 uL per well) on DIV 20. Cells were harvested for Western Blot 10 days after treatment on DIV30.

FIG. 5 is a western blot for an example of 4 SYNGAP1 ASO candidates (ASO-009-ASO-012). SynGAP expression was normalized to the level of Vinculin protein or GAPDH protein and then normalized to the vehicle average.

FIG. 6 depicts a quantification of SynGAP protein boosting for 7 of our SYNGAP1 candidates normalized to Vinculin.

FIG. 7 depicts a quantification of SynGAP protein boosting for 7 of our SYNGAP1 candidates normalized to GAPDH. For the SynGAP blot, exposure was 300s. For GAPDH, exposure was 20s and for Vinculin, exposure was 20s. 20 µg of protein were loaded per lane and a high molecular weight transfer was used. SynGAP Antibody: Anti-SynGAP-(Cell Signaling)-Cat #5539 (1:1000); GAPDH Antibody: Ms ß-Actin-(EMD Millipore)-MAB374 (1:1000); Vinculin Antibody: Ms Vinculin-(Invitrogen)-VLN01-MA5-11690 (1:1000).

Figure 8:
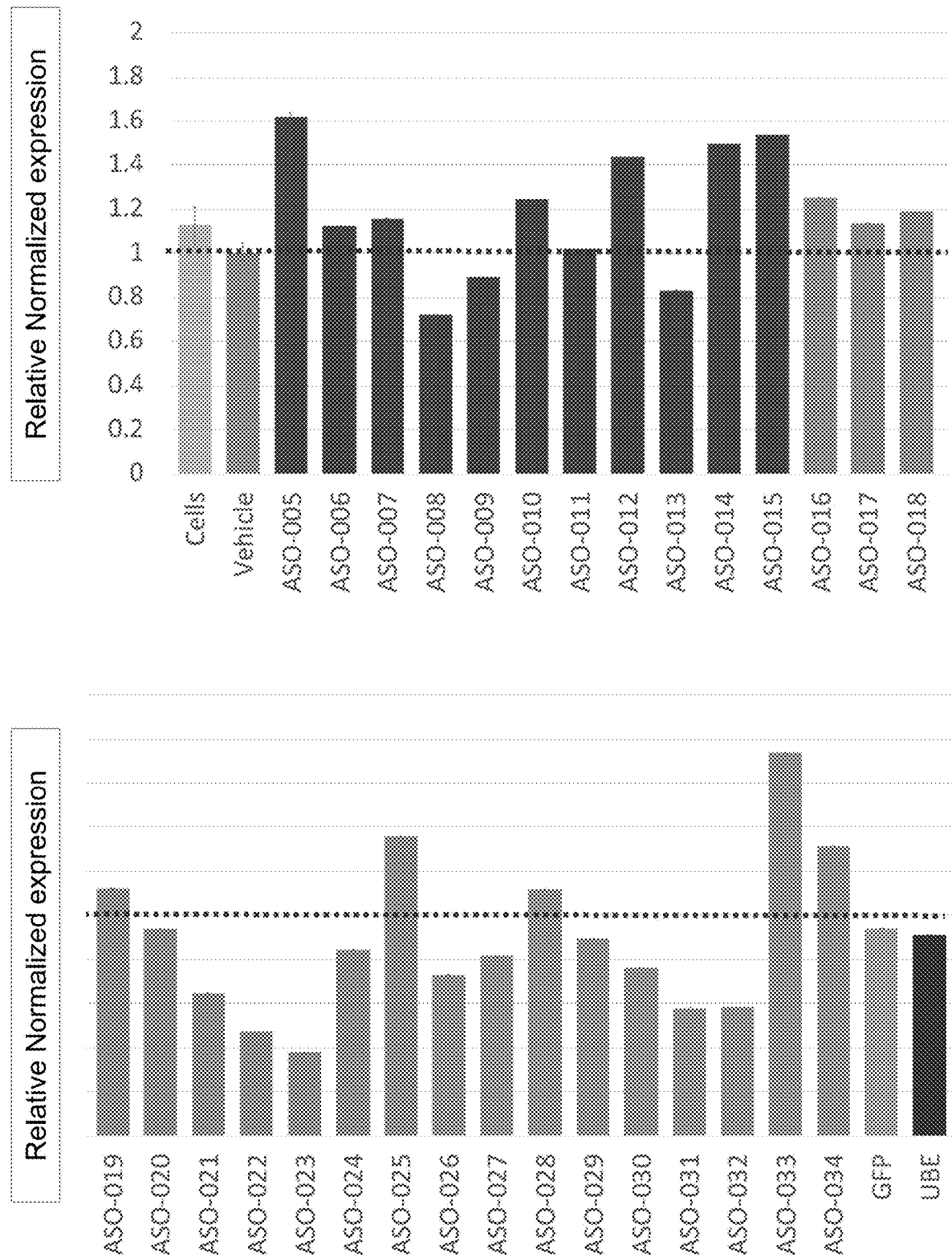
FIG. 8 graphs SynGAP protein boosting, quantified by Western Blot, for ASOs of the disclosure.

FIG. 8 is a Summary graph of SynGAP protein boosting using all SYNGAP1 ASOs (normalized to total protein), quantified by Western Blot, for all SYNGAP1 ASO candidates (ASO-006-ASO-034). Human induced pluripotent stem cell-derived neurons (differentiated via NGN2 overexpression and dual SMAD inhibition) were treated with our SYNGAP1 ASOs and screening for SynGAP protein boosting using Western Blot assay. Neurons were plated at 35k per well on a 96-well plate and treated with 200 nM SYNGAP1 ASO. ASOs were transfected into neurons with Endoporter reagent (0.6 uL per well) on DIV 20. Cells were harvested for Western Blot 10 days after treatment on DIV30. In all experiments, a GFP-targeting ASO (GFP-004) and a UBE3A-targeting ASO (ASO-015) were used as negative controls. SynGAP expression was normalized to the total protein quantification of all lanes and then normalized to a vehicle condition. For the SynGAP blot, exposure was 300s. For total protein quantification, the blots were activated and imaged in UV exposure and quantified using Bio-Rad Software. 20 µg of protein were loaded per lane and a high molecular weight transfer was used. SynGAP Antibody: Anti-SynGAP-(Cell Signaling)-Cat #5539 (1:1000).

Figure 9:
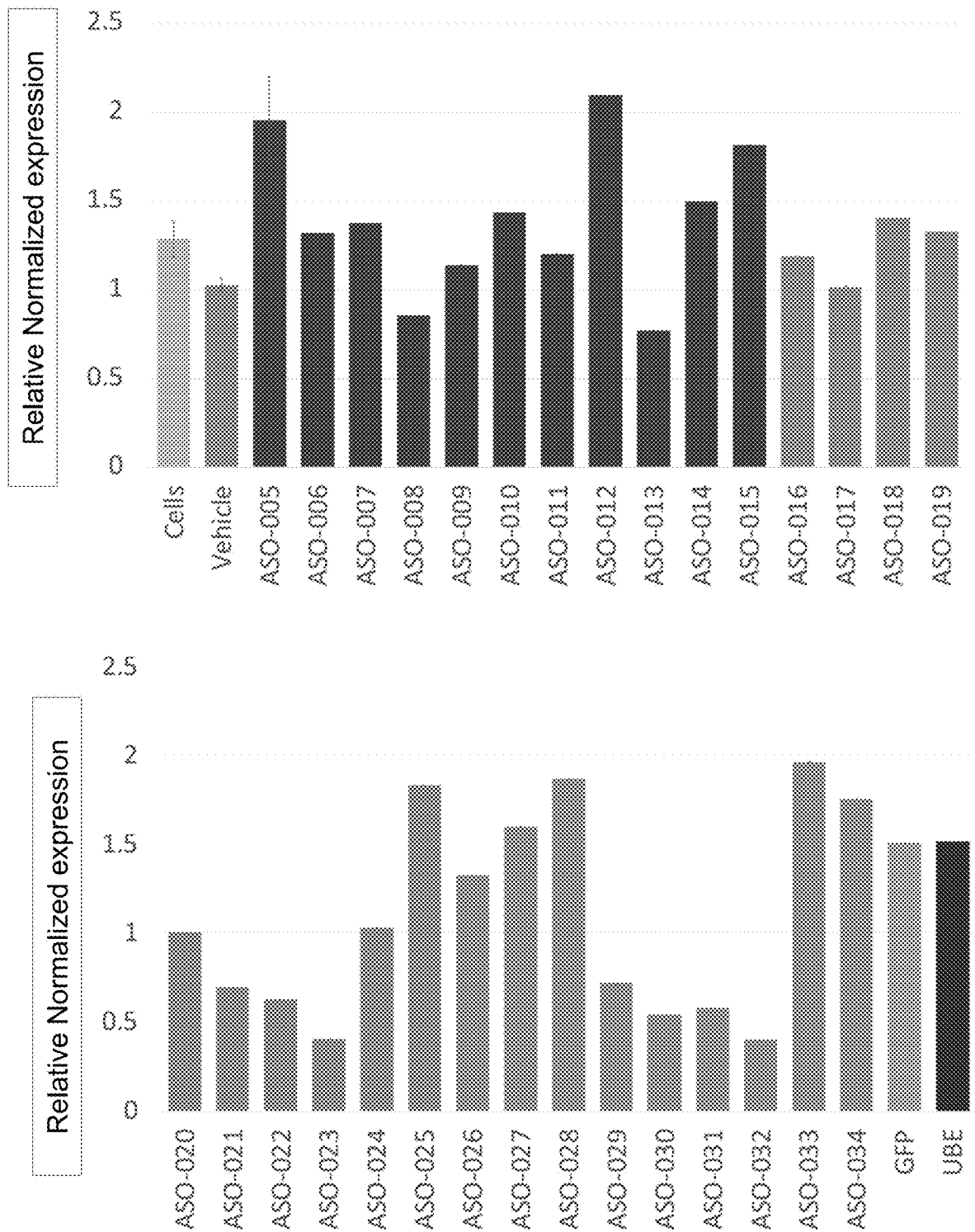
FIG. 9 is summary graph of protein boosting.

FIG. 9 includes summary graph for SynGAP protein boosting, quantified by Western Blot, for all SYNGAP1 ASO candidates (ASO-006-ASO-034). Human induced pluripotent stem cell-derived neurons (differentiated via NGN2 overexpression and dual SMAD inhibition) were treated with SYNGAP1 ASOs of the invention and screening for SynGAP protein boosting using Western Blot assay. Neurons were plated at 35k per well on a 96-well plate and treated with 200 nM SYNGAP1 ASO. ASOs were transfected into neurons with Endoporter reagent (0.6 uL per well) on DIV 20. Cells were harvested for Western Blot 10 days after treatment on DIV30. In all experiments, a GFP-targeting ASO (GFP-004) and a UBE3A-targeting ASO (ASO-015) was used as a negative control. SynGAP expression was normalized to Vinculin protein and then normalized to vehicle average. For the SynGAP blot, exposure was 300s. For Vinculin, exposure was 20s. 20 µg of protein were loaded per lane and a high molecular weight transfer was used. SynGAP Antibody: Anti-SynGAP-(Cell Signaling)-Cat #5539 (1:1000); Vinculin Antibody Ms Vinculin-(Invitrogen)-VLN01-MA5-11690 (1:1000).

Figure 10:
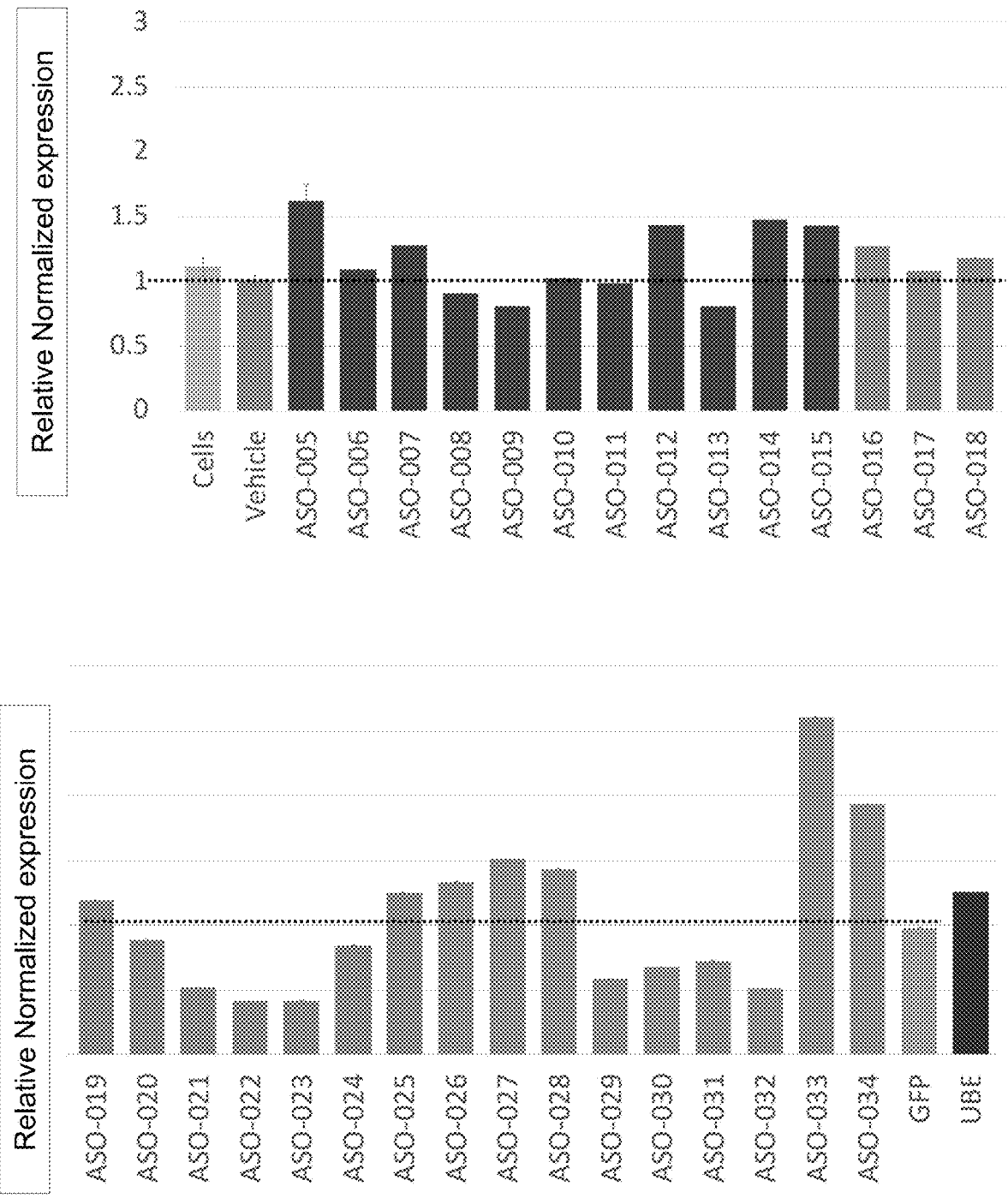
FIG. 10 shows SynGAP protein boosting quantified by Western Blot.

FIG. 10 gives a summary graph of SynGAP protein boosting using all SYNGAP1 ASOs. FIG. 10 includes summary graph for SynGAP protein boosting, quantified by Western Blot, for all SYNGAP1 ASO candidates (ASO-006-ASO-034) when normalized to GAPDH. Human induced pluripotent stem cell-derived neurons (differentiated via NGN2 overexpression and dual SMAD inhibition) were treated with our SYNGAP1 ASOs and screening for SYNGAP1 protein boosting using Western Blot assay. Neurons were plated at 35k per well on a 96-well plate and treated with 200 nM SYNGAP1 ASO. ASOs were transfected into neurons with Endoporter reagent (0.6 uL per well) on DIV 20. Cells were harvested for Western Blot 10 days after treatment on DIV30. In all experiments, a GFP-targeting ASO (GFP-004) and a UBE3A-targeting ASO (ASO-015) were used as negative controls. For the SynGAP blot, exposure was 300s. For GAPDH, exposure was 20s. 20 µg of protein were loaded per lane and a high molecular weight transfer was used. SynGAP Antibody: Anti-SynGAP-(Cell Signaling)-Cat #5539 (1:1000); Ms Vinculin-(Invitrogen)-VLN01-MA5-11690 (1:1000); GAPDH Antibody: Ms β-Actin-(EMD Millipore)-MAB374 (1:1000).

Figure 11:
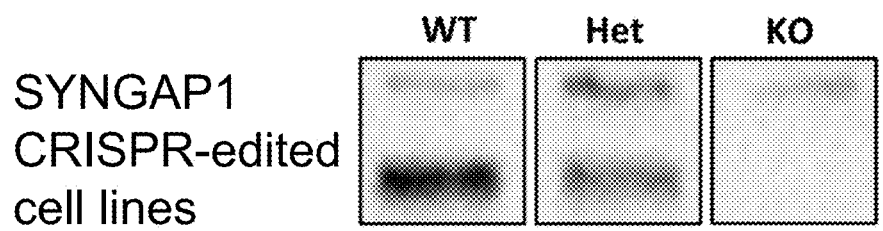
FIG. 11 shows a western blot showing the expression of SynGap expression from neurons for CRISPR edited human iPSC-derived cell lines.

FIG. 11 shows an image of western blot gels that provide data for SYNGAP protein expression from human isogenic CRISPR-edited induced pluripotent stem cell (iPSC)-derived neuronal cell lines that are either wild type (WT) or have heterozygous (Het) or homozygous (knockout; KO) mutations to the SYNGAP1 gene (top left).

Using these CRISPR-edited human iPSC-derived neuronal lines, all-optical electrophysiology was performed and evoked synaptic responses in WT and SYNGAP1 mutant cell lines.

Figure 12:
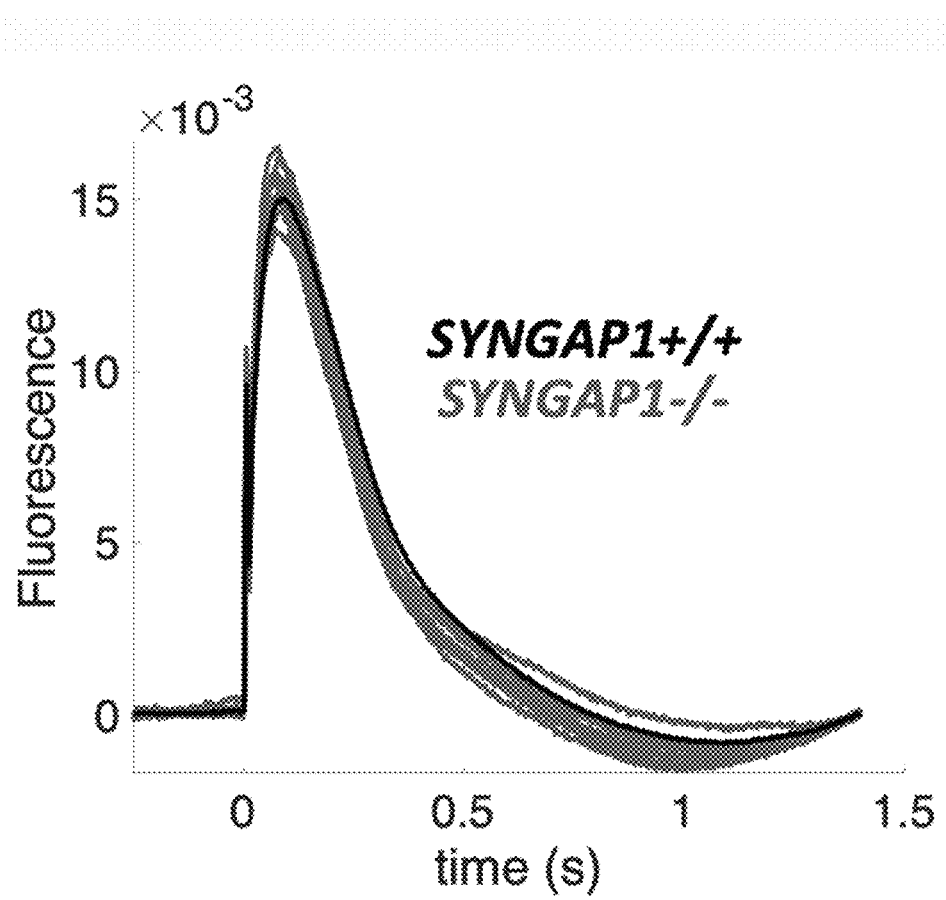
FIG. 12 provides data for SYNGAP1 mutant cell lines (each line represents an individual SYNGAP1 mutant clone) vs the average of all WT clones.

FIG. 12 provides the resulting data shown is for SYN-GAP1 mutant cell lines (each line represents an individual SYNGAP1 mutant clone) vs the average of all WT clones. Human iPSC-derived NGN2 neurons were measured at DIV45.

Figure 13:
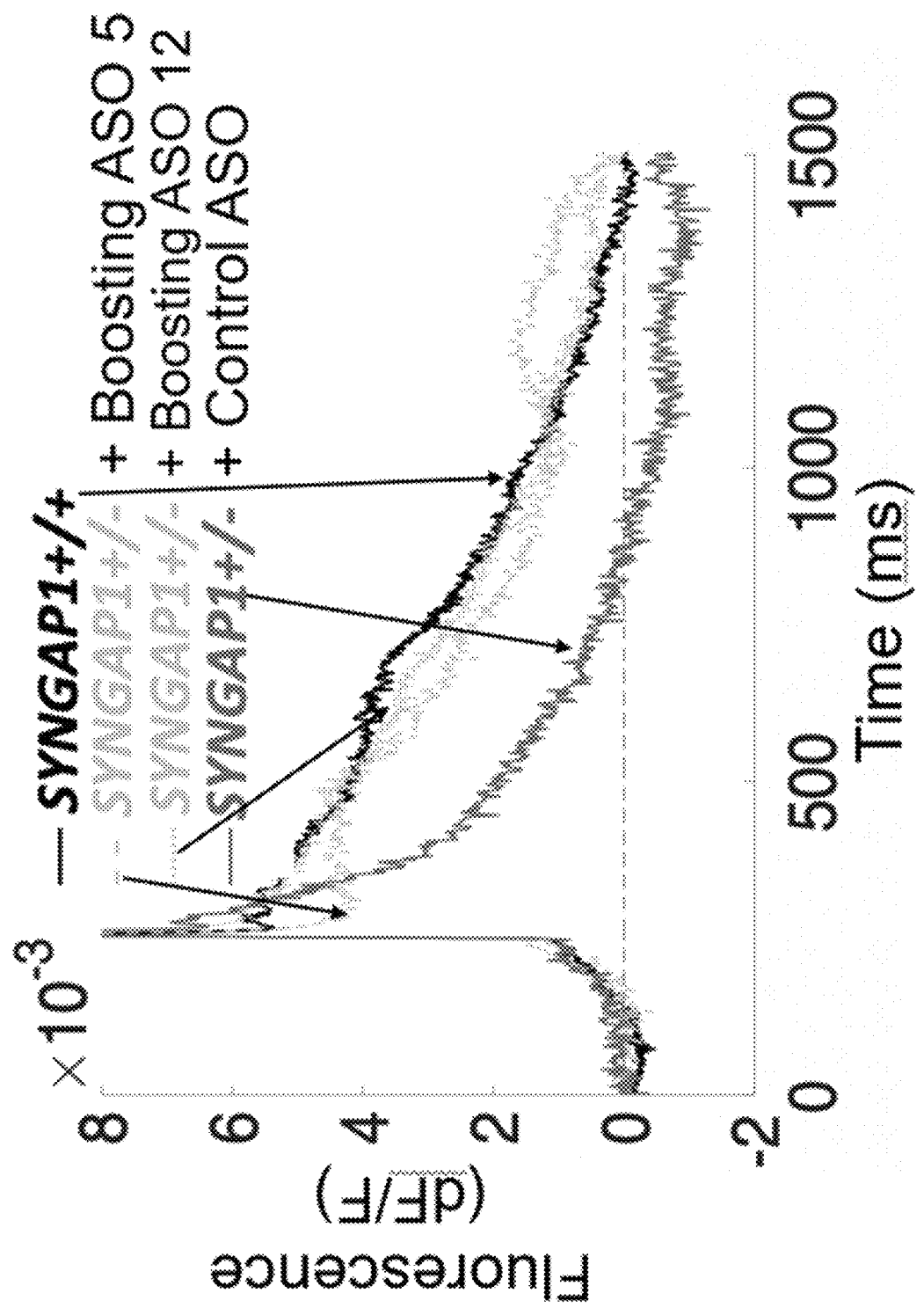
FIG. 13 shows rescue of SYNGAP1 heterozygous phenotype using ASOs of the invention.

FIG. 13 shows rescue of SYNGAP1 heterozygous phenotype using 2 hit ASOs: a published ASO, ASO 5, and a Q-State designed ASO, ASO 12. CRISPR-edited SYNGAP1 heterozygous mutant lines were treated with either ASO 5, ASO 12, or a control ASO that does not modulate SYNGAP expression. Treatment with the SYNGAP protein boosting ASOs 5 and 12 rescue the heterozygous functional synaptic phenotype. Cells were treated with 200 nM ASO on day 20 and measured on day 30.

Oligonucleotides may be made in the laboratory by solid-phase chemical synthesis followed by purification and isolation. When referring to a sequence of the oligonucleotide, reference is made to the sequence or order of nucleobase moieties, or modifications thereof, of the covalently linked nucleotides or nucleosides. The oligonucleotide of the invention may be man-made, i.e., chemically synthesized, and is typically purified or isolated. The oligonucleotide of the invention may comprise one or more modified nucleosides or nucleotides, such as 2' sugar modified nucleosides.

The modified nucleotides may be independently selected from the group consisting of a deoxy-nucleotide, a 3'-terminal deoxy-thymine (dT) nucleotide, a 2'-O-methyl modified nucleotide, a 2'-fluoro modified nucleotide, a 2'-deoxy-modified nucleotide, a locked nucleotide, an unlocked nucleotide, a conformationally restricted nucleotide, a constrained ethyl nucleotide, an abasic nucleotide, a 2'-amino-modified nucleotide, a 2'-O-allyl-modified nucleotide, 2'-C-alkyl-modified nucleotide, 2'-hydroxyl-modified nucleotide, a 2'-methoxyethyl modified nucleotide, a 2'-O-alkyl-modified nucleotide, a morpholino nucleotide, a phosphoramidate, a non-natural base comprising nucleotide, a 1,5-anhydrohexitol modified nucleotide, a cyclohexenyl modified nucleotide, a nucleotide comprising a phosphorothioate group, a nucleotide comprising a methylphosphonate group, a nucleotide comprising a 5'-phosphate, a nucleotide comprising a 5'-phosphate mimic, a glycol modified nucleotide, and a 2'-0-(N-methylacetamide) modified nucleotide, and combinations thereof.

The nitrogenous bases of the ASO may be naturally occurring nucleobases such as adenine, guanine, cytosine, thymidine, uracil, xanthine and hypoxanthine, as well as non-naturally occurring variants, such as substituted purine or substituted pyrimidine, such as nucleobases selected from isocytosine, pseudoisocytosine, 5-methyl cytosine, 5-thiazolo-cytosine, 5-propynyl-cytosine, 5-propynyl-uracil, 5-bromouracil 5-thiazolo-uracil, 2-thio-uracil, 2'thio-thymine, inosine, diaminopurine, 6-aminopurine, 2-aminopurine, 2,6-diaminopurine and 2-chloro-6-aminopurine.

The nucleobase moieties may be indicated by the letter code for each corresponding nucleobase, e.g. A, T, G, C or U, wherein each letter may optionally include modified nucleobases of equivalent function. For example, in the exemplified oligonucleotides, the nucleobase moieties are selected from A, T, G, C, and 5-methyl cytosine. Optionally, 5-methyl cytosine LNA nucleosides may be used.

An oligonucleotide of the disclosure is capable of up-regulating the expression of SYNGAP.

An oligonucleotide of the disclosure may comprise one or more nucleosides which have a modified sugar moiety, i.e., a modification of the sugar moiety when compared to the ribose sugar moiety found in DNA and RNA. Numerous nucleosides with modification of the ribose sugar moiety have been made, primarily with the aim of improving certain properties of oligonucleotides, such as affinity and/or nuclease resistance. Such modifications include those where the ribose ring structure is modified, e.g., by replacement with a hexose ring (HNA), or a bicyclic ring, which typically have a bridge between the C2 and C4 carbons on the ribose ring (LNA), or an unlinked ribose ring which typically lacks a bond between the C2 and C3 carbons (e.g., UNA). Modified nucleosides also include nucleosides where the sugar moiety is replaced with a non-sugar moiety, for example in the case of peptide nucleic acids (PNA), or morpholino nucleic acids.

Sugar modifications also include modifications made via altering the substituent groups on the ribose ring to groups other than hydrogen, or the 2'—OH group naturally found in DNA and RNA nucleosides. Substituents may, for example be introduced at the 2', 3', 4' or 5' positions.

The oligonucleotide may include one or more Locked Nucleic Acid (LNA) bases. An LNA may include a 2'-modified nucleoside which comprises a biradical linking the C2' and C4' of the ribose sugar ring of said nucleoside (also referred to as a "2'-4' bridge"), which restricts or locks the conformation of the ribose ring. These nucleosides are also termed bridged nucleic acid or bicyclic nucleic acid (BNA) in the literature. The locking of the conformation of the ribose is associated with an enhanced affinity of hybridization (duplex stabilization) when the LNA is incorporated into an oligonucleotide for a complementary RNA or DNA molecule. This can be routinely determined by measuring the melting temperature of the oligonucleotide/complement duplex. Non limiting, exemplary LNA nucleosides are disclosed in WO 99/014226, WO 00/66604, WO 98/039352, WO 2004/046160, WO 00/047599, WO 2007/134181, WO 2010/077578, WO 2010/036698, WO 2007/090071, WO 2009/006478, WO 2011/156202, WO 2008/154401, WO 2009/067647, and WO 2008/150729, all incorporated by reference.

Pharmaceutically acceptable salts of oligonucleotides of the disclosure include those salts that retain the biological effectiveness and properties of the free bases or free acids. The salts are formed with inorganic acids such as hydrochloric acid, hydrobromic acid, sulfuric acid, nitric acid, phosphoric acid, particularly hydrochloric acid, and organic acids such as acetic acid, propionic acid, glycolic acid, pyruvic acid, oxalic acid, maleic acid, malonic acid, succinic acid, fumaric acid, tartaric acid, citric acid, benzoic acid, cinnamic acid, a sulfonic acid, or salicylic acid. In addition, those salts may be prepared from addition of an inorganic base or an organic base to the free acid. Salts derived from an inorganic base include, but are not limited to, the sodium, potassium, lithium, ammonium, calcium, magnesium salts. Salts derived from organic bases include, but are not limited to salts of primary, secondary, and tertiary amines, substituted amines including naturally occurring substituted amines, cyclic amines and basic ion exchange resins, such as isopropylamine, trimethylamine, diethylamine, triethylamine, tripropylamine, ethanolamine, lysine, arginine, N-ethylpiperidine, piperidine, polyamine resins.

An ASO may comprise a 2' substituted nucleoside, such as a 2' substituted nucleoside independently selected from the group consisting of 2'-O-alkyl-RNA units, 2'-O-methyl-RNA, 2'-amino-DNA units, 2'-fluoro-DNA units, 2'-alkoxy-RNA, 2'-MOE units, arabino nucleic acid (ANA) units, 2'-fluoro-ANA units, or combinations thereof.

Conjugation of the oligonucleotide to one or more non-nucleotide moieties may improve the pharmacology of the oligonucleotide, e.g., by affecting the activity, cellular distribution, cellular uptake or stability of the oligonucleotide. In some embodiments the conjugate moiety can modify or enhance the pharmacokinetic properties of the oligonucleotide by improving cellular distribution, bioavailability, metabolism, excretion, permeability, and/or cellular uptake of the oligonucleotide. In particular, the conjugate may target the oligonucleotide to a specific organ, tissue or cell type and thereby enhance the effectiveness of the oligonucleotide in that organ, tissue or cell type. The conjugate may also serve to reduce activity of the oligonucleotide in non-target cell types, tissues, or organs, e.g., off target activity or activity in non-target cell types, tissues, or organs.

In an embodiment, the non-nucleotide moiety (conjugate moiety) is selected from the group consisting of carbohydrates, cell surface receptor ligands, drug substances, hormones, lipophilic substances, polymers, proteins, peptides, toxins (e.g., bacterial toxins), vitamins, viral proteins (e.g., capsids) or combinations thereof. In some embodiments, an ASO of the invention is conjugated to an antibody. For example, antibodies may be conjugated to ASOs to promote or facilitate delivery of the ASOs.

A composition of the disclosure may be provided in pharmaceutical compositions that include any of the aforementioned nucleic acids or salts thereof and a pharmaceutically acceptable diluent, carrier, salt and/or adjuvant. A pharmaceutically acceptable diluent includes ACSF artificial cerebrospinal fluid and pharmaceutically acceptable salts include, but are not limited to, sodium and potassium salts. In some embodiments the pharmaceutically acceptable diluent is sterile phosphate buffered saline or sterile sodium carbonate buffer. In some preferred embodiments, diluents for clinical application include Elliotts B solution and/or ACSF artificial cerebrospinal fluid.

In some embodiments the oligonucleotide of the invention is in the form of a solution in the pharmaceutically acceptable diluent, for example dissolved in saline, PBS, or sodium carbonate buffer. The oligonucleotide may be pre-formulated in the solution or in some embodiments may be in the form of a dry powder (e.g., a lyophilized powder) which may be dissolved in the pharmaceutically acceptable diluent prior to administration. Suitably, for example the oligonucleotide may be dissolved in a concentration of 0.1-100 mg/mL, such as 1-10 mg/mL.

The invention provides methods of treating a neurodevelopmental disorder by delivering to a patient in need thereof any of the compositions of the disclosure. The delivered composition may include one or any combination of the disclosed nucleic acids. To say "one nucleic acid" does not mean a single molecule but rather a composition that includes, e.g., millions of, chemically identical, or essentially identical, copies of the molecule. It may be preferable to deliver two or more of the nucleic acids in combination or at different times to the same patient. Preferably, the composition is delivered across the blood-brain barrier. The nucleic acid may be delivered using a vector that promotes crossing the blood brain barrier including e.g., certain viral vectors (e.g., adeno-associated viral vectors) that serve such purpose. The nucleic acid may be packaged with a particle such as for example a viral vector, a vesicle, or a lipid nanoparticle.

The delivery particle may, in-turn, be decorated with ligands that promote delivery, such as, for example, antibodies known to promote receptor-mediated transcytosis across the blood-brain barrier. For a review, see Stanimirovic, 2018, Emerging technologies for delivery of biotherapeutics and gene therapy across the blood-brain barrier, BioDrugs 32 (6): 547-559, incorporated by reference. The composition may be delivered by e.g., systemic or intrathecal injection. The nucleic acid is delivered to increase expression of SynGAP in the patient. Methods may include selecting the patient by identifying that the patient carries a heterozygous loss-of-function mutation in a SYNGAP gene.

Listed below are sequences for order form from commercial providers for certain specific embodiments. Those sequences listed below are the same as are presented in Table 1. The sequences are shown below with nomenclature (i.e., characters) as may be used to order such nucleic acids from a commercial service such as Integrated DNA Technologies.

```
>ASO-006
                                                                    (SEQ ID NO: 1)
/52MOErC/*/12MOErC/*/12MOErA/*/12MOErA/*/12MOErC/*/12MOErG/*/12MOErG/*/
12MOErC/*/12MOErA/*/12MOErG/*/12MOErC/*/12MOErA/*/12MOErG/*/12MOErC/*/
12MOErG/*/i2MOErG/*/32MOErC/

>ASO-007
                                                                    (SEQ ID NO: 2)
/52MOErA/*/i2MOErG/*/12MOErG/*/12MOErA/*/12MOErG/*/12MOErA/*/12MOErA/*/
12MOErT/*/12MOErA/*/12MOErA/*/12MOErG/*/12MOErA/*/i2MOErG/*/i2MOErC/*/
12MOErC/*/i2MOErA/*/32MOErA/

>ASO-008
                                                                    (SEQ ID NO: 3)
/52MOErG/*/12MOErA/*/12MOErG/*/12MOErA/*/12MOErG/*/12MOErG/*/12MOErA/*/
12MOErG/*/12MOErC/*/12MOErA/*/12MOErG/*/12MOErA/*/i2MOErG/*/i2MOErA/*/
12MOErG/*/i2MOErA/*/i2MOErA/*/12MOErG/*/32MOErC/
```

```
>ASO-009                                                       (SEQ ID NO: 4)
/52MOErG/*/i2MOErG/*/i2MOErG/*/i2MOErA/*/i2MOErC/*/i2MOErG/*/i2MOErG/*/
i2MOErG/*/i2MOErG/*/i2MOErG/*/i2MOErA/*/i2MOErG/*/i2MOErA/*/i2MOErA/*/
i2MOErA/*/i2MOErG/*/i2MOErA/*/i2MOErA/*/32MOErG/

>ASO-010                                                       (SEQ ID NO: 5)
/52MOErG/*/i2MOErG/*/i2MOErA/*/i2MOErG/*/i2MOErG/*/i2MOErA/*/i2MOErG/*/
i2MOErG/*/i2MOErA/*/i2MOErG/*/i2MOErG/*/i2MOErA/*/i2MOErG/*/i2MOErA/*/
i2MOErA/*/i2MOErT/*/i2MOErA/*/i2MOErA/*/i2MOErG/*/i2MOErA/*/32MOErG/

>ASO-011                                                       (SEQ ID NO: 6)
/52MOErC/*/i2MOErA/*/i2MOErG/*/i2MOErA/*/i2MOErG/*/i2MOErA/*/i2MOErG/*/
i2MOErG/*/i2MOErA/*/i2MOErG/*/i2MOErG/*/i2MOErA/*/i2MOErG/*/i2MOErA/*/
i2MOErG/*/i2MOErA/*/i2MOErG/*/i2MOErG/*/i2MOErA/*/i2MOErG/*/32MOErG/

>ASO-012                                                       (SEQ ID NO: 7)
/52MOErA/*/i2MOErG/*/i2MOErA/*/i2MOErG/*/i2MOErA/*/i2MOErG/*/i2MOErG/*/
i2MOErA/*/i2MOErG/*/i2MOErG/*/i2MOErA/*/i2MOErG/*/i2MOErA/*/i2MOErG/*/
i2MOErA/*/i2MOErG/*/i2MOErG/*/i2MOErA/*/i2MOErG/*/i2MOErC/*/32MOErA/

>ASO-013                                                       (SEQ ID NO: 8)
/52MOErG/*/i2MOErG/*/i2MOErG/*/i2MOErA/*/i2MOErG/*/i2MOErA/*/i2MOErA/*/
i2MOErA/*/i2MOErG/*/i2MOErA/*/i2MOErG/*/i2MOErG/*/i2MOErG/*/i2MOErG/*/
i2MOErG/*/i2MOErA/*/i2MOErG/*/i2MOErA/*/i2MOErA/*/i2MOErG/*/32MOErG/

>ASO-014                                                       (SEQ ID NO: 9)
/52MOErA/*/i2MOErG/*/i2MOErA/*/i2MOErA/*/i2MOErA/*/i2MOErG/*/i2MOErA/*/
i2MOErA/*/i2MOErG/*/i2MOErA/*/i2MOErG/*/i2MOErA/*/i2MOErG/*/i2MOErA/*/
i2MOErA/*/i2MOErA/*/i2MOErG/*/i2MOErA/*/i2MOErG/*/i2MOErG/*/32MOErG/

>ASO-015                                                       (SEQ ID NO: 10)
/52MOErG/*/12MOErG/*/12MOErA/*/12MOErG/*/12MOErA/*/12MOErA/*/12MOErA/*/
12MOErG/*/12MOErA/*/12MOErA/*/12MOErG/*/12MOErA/*/12MOErG/*/12MOErA/*/
i2MOErG/*/i2MOErA/*/i2MOErA/*/i2MOErA/*/i2MOErG/*/i2MOErA/*/32MOErG/

>ASO-016                                                       (SEQ ID NO: 11)
/52MOErG/*/i2MOErA/*/i2MOErT/*/i2MOErA/*/i2MOErG/*/i2MOErC/*/i2MOErA/*/
i2MOErC/*/12MOErC/*/12MOErC/*/i2MOErC/*/i2MOErG/*/i2MOErG/*/i2MOErA/*/
12MOErG/*/32MOErT/

>ASO-017                                                       (SEQ ID NO: 12)
/52MOErG/*/i2MOErG/*/i2MOErA/*/i2MOErT/*/12MOErA/*/i2MOErG/*/i2MOErC/*/
12MOErA/*/12MOErC/*/12MOErC/*/12MOErC/*/i2MOErG/*/i2MOErG/*/
12MOErA/*/i2MOErG/*/32MOErT/

>ASO-018                                                       (SEQ ID NO: 13)
/52MOErG/*/i2MOErA/*/i2MOErG/*/i2MOErG/*/i2MOErA/*/i2MOErT/*/i2MOErG/*/
i2MOErG/*/i2MOErG/*/i2MOErG/*/12MOErA/*/12MOErT/*/12MOErA/*/i2MOErG/*/
i2MOErC/*/i2MOErA/*/i2MOErC/*/i2MOErC/*/32MOErC/

>ASO-019                                                       (SEQ ID NO: 14)
/52MOErA/*/i2MOErG/*/12MOErA/*/i2MOErG/*/i2MOErG/*/i2MOErA/*/i2MOErT/*/
i2MOErG/*/12MOErG/*/12MOErG/*/12MOErG/*/i2MOErA/*/i2MOErT/*/i2MOErA/*/
i2MOErG/*/i2MOErC/*/i2MOErA/*/i2MOErC/*/i2MOErC/*/32MOErC/

>ASO-020                                                       (SEQ ID NO: 15)
/52MOErC/*/12MOErA/*/12MOErG/*/i2MOErA/*/i2MOErG/*/i2MOErG/*/i2MOErA/*/
12MOErT/*/12MOErG/*/12MOErG/*/12MOErG/*/12MOErG/*/i2MOErA/*/i2MOErT/*/
i2MOErA/*/i2MOErG/*/12MOErC/*/12MOErA/*/12MOErC/*/32MOErC/

>ASO-021                                                       (SEQ ID NO: 16)
/52MOErC/*/i2MOErA/*/12MOErG/*/12MOErA/*/12MOErG/*/12MOErG/*/i2MOErA/*/
12MOErT/*/12MOErG/*/12MOErG/*/12MOErG/*/12MOErG/*/12MOErA/*/12MOErT/*/
i2MOErA/*/i2MOErG/*/12MOErC/*/12MOErA/*/12MOErC/*/32MOErC/
```

-continued

```
>ASO-022
                                                       (SEQ ID NO: 17)
/52MOErT/*/12MOErG/*/12MOErA/*/i2MOErG/*/i2MOErG/*/i2MOErC/*/i2MOErA/*/
i2MOErG/*/12MOErA/*/12MOErG/*/i2MOErG/*/i2MOErA/*/i2MOErT/*/12MOErG/*/
i2MOErG/*/i2MOErG/*/12MOErG/*/i2MOErA/*/i2MOErT/*/32MOErA/

>ASO-023
                                                       (SEQ ID NO: 18)
/52MOErC/*/i2MOErG/*/i2MOErG/*/12MOErA/*/12MOErG/*/i2MOErT/*/i2MOErG/*/
i2MOErA/*/i2MOErA/*/i2MOErG/*/12MOErG/*/i2MOErG/*/i2MOErG/*/i2MOErT/*/
i2MOErC/*/i2MOErT/*/12MOErG/*/12MOErT/*/i2MOErA/*/32MOErC/

>ASO-024
                                                       (SEQ ID NO: 19)
/52MOErT/*/12MOErA/*/i2MOErC/*/12MOErG/*/12MOErG/*/12MOErG/*/i2MOErG/*/
i2MOErT/*/12MOErA/*/12MOErG/*/i2MOErG/*/i2MOErC/*/i2MOErG/*/i2MOErG/*/
12MOErT/*/12MOErG/*/12MOErT/*/32MOErC/

>ASO-025
                                                       (SEQ ID NO: 20)
/52MOErG/*/12MOErG/*/12MOErT/*/12MOErG/*/12MOErT/*/12MOErC/*/12MOErC/*/
12MOErT/*/12MOErG/*/12MOErG/*/12MOErG/*/i2MOErG/*/12MOErC/*/i2MOErA/*/
12MOErA/*/12MOErG/*/12MOErG/*/12MOErG/*/12MOErT/*/32MOErC/

>ASO-026
                                                       (SEQ ID NO: 21)
/52MOErA/*/52MOErG/*/52MOErG/*/52MOErA/*/iMe-dC/*T*T*/iMe-dC/*A*G*/
iMe-dC/*A*G*/iMe-dC/*T*/iMe-dC/*/32MOErC/*/32MOErC/*/32MOErC/*/32MOErG/

>ASO-027
                                                       (SEQ ID NO: 22)
/52MOErC/*/i2MOErC/*/i2MOErC/*/12MOErT/*G*/iMe-dC/*/iMe-dC/*T*/iMe-dC/*T*/
iMe-dC/*G*G*T*/iMe-dC/*/iMe-dC/*/12MOErT/*/12MOErC/*/i2MOErT/*/32MOErG/

>ASO-028
                                                       (SEQ ID NO: 23)
/52MOErG/*/12MOErG/*/12MOErG/*/12MOErT/*G*/iMe-dC/*T*A*/iMe-dC/*A*/
iMe-dC/*T*T*A*A*T*/12MOErC/*/i2MOErA/*/i2MOErC/*/32MOErC/

>ASO-029
                                                       (SEQ ID NO: 24)
/52MOErG/*/i2MOErC/*/i2MOErA/*/12MOErT/*/iMe-dC/*A*T*T*G*G*/iMe-
dC/*A*G*T*G*/12MOErA/*/i2MOErG/*/i2MOErG/*/32MOErG/

>ASO-030
                                                       (SEQ ID NO: 25)
/52MOErA/*/i2MOErG/*/i2MOErC/*/12MOErA/*T*/iMe-dC/*A*T*T*G*G*/iMe-
dC/*A*G*G*T*/12MOErG/*/i2MOErA/*/i2MOErG/*/32MOErG/

>ASO-031
                                                       (SEQ ID NO: 26)
/52MOErG/*/12MOErA/*/i2MOErT/*/i2MOErT/*/iMe-dC/*/iMe-dC/*/iMe-
dC/*A*G*A*T*/iMe-dC/*A*A*G*A*/12MOErG/*/i2MOErC/*/i2MOErA/*/32MOErT/

>ASO-032
                                                       (SEQ ID NO: 27)
/52MOErA/*/12MOErG/*/12MOErC/*/i2MOErA/*G*G*/iMe-
dC/*A*G*A*G*A*A*G*G*A*/12MOErT/*/i2MOErT/*/i2MOErC/*/32MOErC/

>ASO-033
                                                       (SEQ ID NO: 28)
/52MOErG/*/12MOErC/*/i2MOErT/*/12MOErG/*/iMe-dC/*T*G*T*/iMe-dC/*/iMe-dC/*/
iMe-dC/*A*G*G*A*A*/12MOErG/*/12MOErA/*/i2MOErA/*/32MOErC/

>ASO-034
                                                       (SEQ ID NO: 29)
/52MOErG/*/i2MOErC/*/i2MOErT/*/12MOErG/*G*/iMe-dC/*/iMe-dC/*T*/iMe-
dC/*T*T*/iMe-dC/*T*T*A*G*/i2MOErT/*/i2MOErT/*/12MOErT/*/32MOErG/
```

The invention relates to therapeutic compositions for disorders associated with haploinsufficiency. The invention provides antisense oligonucleotides useful for treating neurodevelopmental disorders associated with mutations in the SYNGAP gene. The invention provides compositions that include synthetic antisense oligonucleotides (ASOs) that promote expression of the SynGAP protein by one or any combination of (i) preventing one or more miRNAs from interfering with production of the Syngap protein; (ii) binding to the 5'-UTR of the SYNGAP1 transcript and augmenting translation of the SynGAP protein; and (iii) promoting RNAseH cleavage of antisense long non-coding RNAs that are anticorrelated with SYNGAP expression. When the composition is delivered to a patient with SYNGAP haploinsufficiency, the ASOs promote expression of the SynGAP protein.

What is claimed is:

1. A composition comprising: at least one nucleic acid that promotes expression of a SynGAP protein from a transcript of the SYNGAP gene, wherein the nucleic acid comprises a gapmer structure having a central DNA segment flanked by modified RNA wings, and wherein the nucleic acid has the sequence of one of SEQ ID Nos: 28-29, wherein a majority of inter-base linkages in the nucleic acid are phosphorothioate bonds, a majority of instances of U and C in the nucleic acid are methylated at position 5, and a majority of the bases in the nucleic acid comprise 2'-O-methoxyethyl ribose sugars.

2. The composition of claim 1, wherein all instances of U and C are methylated at position 5; and all inter-base linkages in the nucleic acid are phosphorothioate bonds.

3. The composition of claim 1, wherein the nucleic acid mediates digestion of a long, non-coding RNA antisense to the transcript.

4. The composition of claim 3, wherein the composition comprises a plurality of nucleic acids, each of the nucleic acids having one of SEQ ID NOs: 28-29.

5. The composition of claim 3, wherein the central DNA segment comprises at least 9 DNA bases.

6. The composition of claim 5, wherein each RNA wing comprises 2'-O-methoxyethyl RNA.

7. The composition of claim 3, wherein the oligonucleotide comprises a central 12 DNA bases flanked by a 5' RNA wing and a 3' RNA wing, the 5' wing and the 3' wing each comprising four consecutive 2' modified RNA bases.

8. The composition of claim 7, further comprising a plurality of the nucleic acids, wherein a plurality of the nucleic acids tile along the long, non-coding RNA antisense to the transcript; and/or in which the oligonucleotide has the sequence of one of SEQ ID NOs: 28-29 and in which both RNA wings consist of four 2'-O-methoxyethyl-modified RNA bases.

* * * * *